US011978317B2

(12) United States Patent
Kiss et al.

(10) Patent No.: US 11,978,317 B2
(45) Date of Patent: May 7, 2024

(54) GAMING SYSTEMS AND METHODS FOR PROVIDING REEL-SPIN GAME ENHANCEMENT FEATURES

(71) Applicant: IGT, Las Vegas, NV (US)

(72) Inventors: Elisabeth Kiss, Unterpremstätten (AT); Susanne Kiss, Oberwart (AT); Julia-Ines Lerchbaumer, Spielfeld (AT); Bruno Rittner, Hausmannstaetten (AT); Michael Russ, Styria (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 18/109,647

(22) Filed: Feb. 14, 2023

(65) Prior Publication Data

US 2023/0186730 A1 Jun. 15, 2023

Related U.S. Application Data

(63) Continuation of application No. 17/530,637, filed on Nov. 19, 2021, now Pat. No. 11,620,873, which is a continuation of application No. 16/821,717, filed on Mar. 17, 2020, now Pat. No. 11,238,701.

(51) Int. Cl.
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
CPC ............. G07F 17/3267; G07F 17/3213; G07F 17/3244
See application file for complete search history.

(56) References Cited

U.S. PATENT DOCUMENTS

| | | | |
|---|---|---|---|
| 7,318,774 | B2 | 1/2008 | Bryant et al. |
| 8,147,334 | B2 | 4/2012 | Gatto et al. |
| 8,764,566 | B2 | 7/2014 | Miltenberger et al. |
| 11,238,701 | B2 | 2/2022 | Kiss et al. |
| 11,610,454 | B2 | 3/2023 | Kiss et al. |
| 11,620,873 | B2 | 4/2023 | Kiss et al. |

(Continued)

OTHER PUBLICATIONS

Official Action for U.S. Appl. No. 16/821,717, dated Apr. 1, 2021 18 pages.

(Continued)

*Primary Examiner* — David L Lewis
*Assistant Examiner* — Shauna-Kay Hall
(74) *Attorney, Agent, or Firm* — Sheridan Ross P.C.

(57) ABSTRACT

The present disclosure relates generally to systems and methods for providing reel-spin game enhancement features. A player enrolled with a subscription service server is presented with an opportunity to enhance game features associated with a gaming device after a result of a game played on the gaming device is determined. The gaming device determines that only when the result of the game played corresponds to a predetermined outcome, a respin option becomes available for the player. This option is rendered as an offer for the player to activate a game enhancement feature for a respin during a subsequent play of the reel-spin game. The game enhancement features include holding or locking a symbol in the reels of the reel-spin game, adding a score multiplier, or adding a modified symbol to a particular position or reel, during the respin of the subsequent play of the reel-spin game.

19 Claims, 10 Drawing Sheets

(56) References Cited

U.S. PATENT DOCUMENTS

| | | | |
|---|---|---|---|
| 2002/0043759 | A1 | 4/2002 | Vancura |
| 2005/0075163 | A1 | 4/2005 | Cuddy et al. |
| 2006/0189377 | A1 | 8/2006 | Gomez et al. |
| 2008/0318660 | A1 | 12/2008 | Nores |
| 2011/0136561 | A1 | 6/2011 | Acres |
| 2012/0184349 | A1 | 7/2012 | Barclay et al. |
| 2012/0270658 | A1 | 10/2012 | Joung |
| 2015/0348355 | A1 | 12/2015 | Caputo et al. |
| 2020/0294361 | A1 | 9/2020 | Peterson et al. |

OTHER PUBLICATIONS

Notice of Allowance for U.S. Appl. No. 16/821,717, dated Aug. 6, 2021.
Official Action for U.S. Appl. No. 17/520,948, dated Oct. 4, 2022 15 pages.
Notice of Allowance for U.S. Appl. No. 17/520,948, dated Nov. 22, 2022 9 pages.
Official Action for U.S. Appl. No. 17/530,637, dated Oct. 5, 2022 18 pages.
Notice of Allowance for U.S. Appl. No. 17/530,637, dated Nov. 16, 2022 9 pages.
Notice of Allowance for U.S. Appl. No. 18/113,439, dated Oct. 10, 2023 10 pages.

GAMING SYSTEMS AND METHODS FOR PROVIDING REEL-SPIN GAME ENHANCEMENT FEATURES

CROSS REFERENCE TO RELATED APPLICATION

The present application is a continuation of U.S. patent application Ser. No. 17/530,637, filed Nov. 19, 2021, which is a continuation of U.S. patent application Ser. No. 16/821,717, filed Mar. 17, 2020, the entire disclosure of which is hereby incorporated by reference.

BACKGROUND

The present disclosure is generally directed to gaming systems and, in particular, toward gaming systems that enable enhanced playing features based on player subscription information.

Gaming machines typically offer a number of built-in game play features that contribute to the overall player experience. Any type of game play feature that presents the player with an additional opportunity to win is often viewed as desirable and can lead to increased play of the gaming machine.

BRIEF SUMMARY

In certain embodiments, the present disclosure relates to a device, method, and system that provide enhancement features for reel-spin gaming devices. In some embodiments, a gaming device is provided, comprising: a display device; a processor coupled to the display device; and a memory coupled with and readable by the processor and storing therein instructions that, when executed by the processor, cause the processor to: determine an identity of a player interacting with the gaming device; determine, based on the identity of the player, that the player is enrolled in a game continuation register; retrieve, in response to determining the player is enrolled in the game continuation register, game continuation rules for the player; determine a result of a reel-spin game played by the player interacting with the gaming device; determine, based on the game continuation rules and the result of the reel-spin game, that a respin option is available for the player; render, by the display device in response to determining that the respin option is available, an offer to activate a game enhancement feature that modifies a win probability associated with the reel-spin game; receive input from the player interacting with the gaming device accepting the offer to activate the game enhancement feature in a subsequent play of the reel-spin game; and initiate, based on the input accepting the offer to activate the game enhancement feature, a respin of a first portion of a plurality of reels of the reel-spin game activating the game enhancement feature for the respin.

In some embodiments, a method is provided, comprising: determining, by a processor of a gaming device, an identity of a player interacting with the gaming device; determining, by the processor and based on the identity of the player, that the player is enrolled in a game continuation register; retrieving, in response to determining the player is enrolled in the game continuation register, game continuation rules for the player; determining, by the processor, a result of a reel-spin game played by the player interacting with the gaming device; determine, by the processor based on the game continuation rules and the result of the reel-spin game, that a respin option is available for the player; rendering, by a display device of the gaming device in response to determining that the respin option is available, an offer to activate a game enhancement feature that modifies a win probability associated with the reel-spin game; receiving, via a user interface of the gaming device, input from the player interacting with the gaming device accepting the offer to activate the game enhancement feature in a subsequent play of the reel-spin game; and initiating, via the processor and based on the input accepting the offer to activate the game enhancement feature, a respin of a first portion of a plurality of reels of the reel-spin game activating the game enhancement feature for the respin.

In some embodiments, a server is provided, comprising: a communications interface; a processor coupled to the communications interface; and a memory coupled with and readable by the processor and storing therein instructions that, when executed by the processor, cause the processor to: receive, via the communications interface, a request for subscriber information about a player interacting with a reel-spin gaming device that is separate from the server; determine that the player is enrolled in a gaming subscription register stored in a memory location of the server; and send, via the communications interface, the subscriber information about the player comprising game continuation rules for the player defining game enhancement feature options for a continuation of a game played on the reel-spin gaming device based on an outcome of the game played and on a subscriber level of the player in the subscriber information.

Additional features and advantages are described herein and will be apparent from the following Description and the figures.

DETAILED DESCRIPTION

Figure 1:
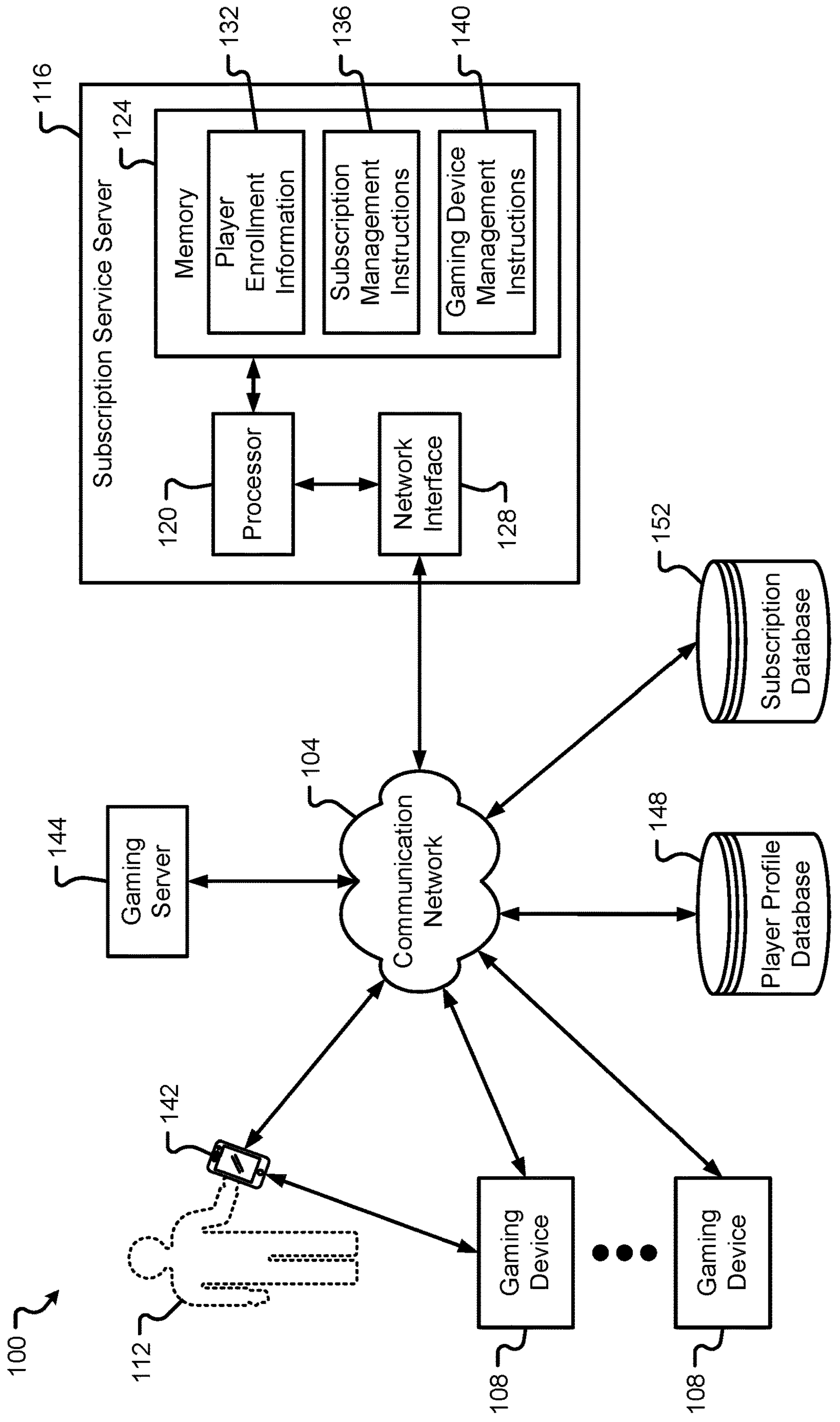
FIG. 1 is a block diagram of a gaming system for providing enhanced gaming features for gaming devices based on subscription service enrollment of identified players.

Embodiments of the present disclosure will be described in connection with an enhanced feature gaming system having one or multiple gaming devices that are capable of providing enhanced game features that modify a win probability associated with a game played via the one or multiple gaming devices. The gaming devices may comprise a computational device, such as a slot machine or Electronic Gaming Machine (EGM), that implements a symbol lock and respin operation. While embodiments of the present disclosure will be described in connection with the example of a slot machine, or EGM implementing game enhancement features (e.g., symbol lock, reel lock, and/or other respin operations, etc.), it should be appreciated that embodiments of the present disclosure are not so limited. For instance, other types of computational devices, such as portable user devices, smartphones, tablets, laptops, Personal Computers (PCs), wearable devices, etc. may be used to implement game enhancement features as part of a game as described herein. Furthermore, it should be appreciated that embodiments of the present disclosure may apply to games other than slot games. For instance, embodiments of the present disclosure may be used in connection with any type of game such as bingo, keno, slots, video poker, table games, etc.

In some embodiments, a player may be presented with the opportunity to enhance game features associated with a gaming device after a result of a game played on the gaming device. For instance, the gaming device may determine that the result of the game played corresponds to a "near miss win" (e.g., where four out of five symbols in a reel-spin game are aligned with a pay line, etc.). In this case, the gaming device may suggest a respin option is available for the player and render an offer for the player to activate a game enhancement feature for a respin during a subsequent play of the reel-spin game. The game enhancement features may include at least one of holding, or locking, a particular reel (while other reels are unlocked), respinning a selected reel (while other reels are locked), respinning a symbol position (while other symbols are locked), locking a symbol position (while other symbol positions are unlocked), adding a score multiplier, and adding a modified symbol option (e.g., activating a wild symbol, a bonus symbol, etc.) to a particular position or reel, during the respin of the subsequent play of the reel-spin game.

The determination of whether a respin option is available for a player may comprise accessing a subscription services database (e.g., stored on a server, etc.). The subscription services database may correspond to a game continuation register that comprises information about a player identification, enrollment status, available respin options, and other game enhancement features for an enrolled player. Player identification information may comprise any information to differentiate one player from another in a gaming system, database, or other gaming environment. In some embodiments, a player may not be currently enrolled in the subscription services database, or may be enrolled at a subscription level where only a limited number of game enhancement features are available. In this instance, the gaming device may suggest that game enhancement features are available upon enrollment in the game continuation register. Enrollment may require a one-time or recurring payment from the player. Game enhancement features may be activated, as described herein, during a base game and/or during a bonus play-off, free game, and/or other game feature.

Among other things, embodiments of the present disclosure provide a player with more ways to win a game, continue to play games that would have traditionally ended, and add excitement to the overall game-playing experience.

With reference initially to FIG. 1, details of an illustrative enhanced feature gaming system 100 will be described in accordance with at least some embodiments of the present disclosure. The components of the enhanced feature gaming system 100, while depicted as having particular instruction sets and devices, are not necessarily limited to the examples depicted herein. Rather, a system according to embodiments of the present disclosure may include one, some, or all of the components depicted in the system 100 and does not necessarily have to include all of the components in a single device. For instance, the components of a server may be distributed amongst a plurality of servers and/or other devices (e.g., gaming devices, EGMs, mobile devices, etc.) in the system 100 without departing from the scope of the present disclosure.

The enhanced feature gaming system 100 is shown to include a communication network 104 that interconnects and facilitates machine-to-machine communications between one or multiple gaming devices 108, a subscription service server 116, and a gaming server 144. In some embodiments, the subscription service server 116 may be connected to one or more of the player profile database 148 and/or the subscription database 152 directly. In some embodiments, the subscription service server 116 may receive player and subscription data from the player profile database 148 and the subscription database 152, respectively, via another server (e.g., gaming server 144, etc.). It should be appreciated that the communication network 104 may correspond to one or many communication networks without departing from the scope of the present disclosure. In some embodiments, the gaming devices 108 and server(s) 116, 144 may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming devices 108 may be distributed throughout a single property or premises (e.g., a single casino floor) or the gaming devices 108 may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 may utilize the same or different types of communication protocols to connect with the communication network 104. It should also be appreciated that the gaming devices 108 may or may not provide the same type of game, game enhancement features, respin options, to a player 112 (e.g., a user interacting with the gaming device 108). For instance, a first gaming device 108 may correspond to a gaming machine that presents a slot game to the player 112, a second gaming device 108 may correspond to a gaming machine that presents a card game to the player 112, and other gaming devices 108 may present other types of games or a plurality of different games for selection and eventual play by a player 112. It may be possible for the some of the gaming devices 108 to communicate with one another via the communication network 104. In some embodiments, one or more of the gaming devices 108 may be configured to communicate with a subscription service server 116. The enhanced feature gaming system 100 may include a gaming server 144 or collection of servers that are responsible for managing the operation of the various gaming devices 108 in the enhanced feature gaming system 100. It should also be appreciated that the subscription service server 116 may or may not be co-located with one or more gaming devices 108 in the same property or premises. Thus, one or more gaming devices 108 may communicate with the subscription service server 116 over a WAN, such as the Internet. In such an event, a tunneling protocol or Virtual Private Network (VPN) may be established over some of the communication network 104 to ensure that communications between a gaming device 108 and a remotely-located server 116 are secured.

A gaming device 108 may correspond to a type of device that enables player interaction in connection with playing games (e.g., games of chance, etc.), selecting game enhancement features, and enrolling in subscription services for games. For instance, the gaming devices 108 may correspond to a type of device that enables a player 112 to interact via a display device (e.g., touchscreen, etc.) and/or physical buttons, etc. of the gaming device 108. A gaming device 108 may include any type of known gaming device such as a slot machine, a table game, an electronic table game (e.g., video poker), a skill-based game, etc. The gaming device 108 can be in the form of an EGM, virtual gaming machine, video game gambling machine, etc. One particular type of gaming device 108 may include mobile devices 142 such as portable communications devices, personal computers, and/or other microprocessor-enabled devices having memory and communications interfaces. Non-limiting examples of a mobile device 142 include a cellular phone, a smartphone, a tablet, a wearable device, an augmented reality headset, a virtual reality headset, a laptop, a PC, or the like. In addition to playing games on a gaming device 108, the players 112 may also be able to enroll in subscription services via a respective mobile device 142. In some embodiments, the mobile device 142 may interact with a particular gaming device 108 to allow a player 112 to play games on one device while simultaneously enrolling in subscription services, or altering a subscription service level of a player 112, on another device. The mobile device 142 may run an application that, among other things, enables the various game presentations, outputs, and interfaces described herein. As provided above, the mobile device 142 may correspond to a player's 112 personal device (e.g., a smartphone) or to a device that is issued to the player 112 during the player's visit to a particular casino. It should be appreciated that the player 112 may play games directly on their mobile device 142 and/or the mobile device 142 may be in communication with another gaming device 108 such that the mobile device 142 provides the human-to-machine interface for the player 112 to interact with the other gaming device 108. As shown in FIG. 1, the mobile device 142 may be in communication with the communication network 104 or in direct communication (e.g., via Bluetooth, WiFi, etc.) with another gaming device 108 in the enhanced feature gaming system 100.

The subscription service server 116 is shown to include a processor 120, memory 124, and a network interface 128. These resources may enable functionality of the subscription service server 116 as will be described herein. For instance, the network interface 128 provides the server 116 with the ability to send and receive communication packets or the like over the communication network 104. The network interface 128 may be provided as a network interface card (NIC), a Slot Machine Interface Board (SMIB), a network port, a modem, drivers for the same, and the like. Communications between the components of the server 116 and other devices connected to the communication network 104 may all flow through the network interface 128.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various video management, player authentication, and gaming device management functions of the video distribution server 116.

The memory 124 may include any type of computer memory device or collection of computer memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data into a player profile database 148 and/or a subscription database 152 and retrieve information from the databases 148, 152. Alternatively or additionally, the player profile database 148 or data stored therein may be stored internal to the server 116 (e.g., within the memory 124 of the server 116 rather than in a separate database) or the gaming server 144. Alternatively or additionally, the subscription database 152 or data stored therein may be stored internal to the subscription service server 116 or the gaming server 144.

The memory 124 may store various data and instruction sets that allow the subscription service server 116 to manage respin options, the presentation of offers to activate game enhancement features for a respin to one or more gaming devices 108, and the enrollment of a player 112 in a game continuation register or subscription database 152. Examples of data may include, but are in no way limited to, player enrollment information 132. The player enrollment information 132 may comprise game continuation rules, enrollment status of a player 112 at a particular subscription service level, available respin options, historical game play, and/or the like. Additionally or alternatively, the player enrollment information 132 may comprise information about the player 112 including, but in no way limited to, player identification information, gaming history, general subscription services enrollment information, player ranking, and/or the like.

Illustrative instruction sets that may be stored in memory 124 include, without limitation, a subscription management instruction set 136 and a gaming device management instruction set 140. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Stated another way, the particular instruction sets depicted in FIG. 1 should not be construed as limiting embodiments described herein.

The subscription management instruction set 136, when executed by the processor 120, may enable the subscription service server 116 to determine at least one of an offer to render to the gaming device 108, manage a subscription status of a player 112 interacting with the gaming device 108, and determine rules for the gaming device 108 based on the subscription status of the player 112. For instance, upon determining an identity of a player 112 interacting with the gaming device 108, the subscription management instruction set 136 may access the player profile database 148 and/or the subscription database 152 to retrieve data about the identified player 112. Using the identity of the player 112, the subscription management instruction set 136 may refer to an enrollment status of the player 112 in a game continuation register, or data structure, of the subscription database 152. This data structure may define particular game enhancement features available to the player 112 during a respin, or continuation of a game played at the gaming device 108.

Upon determining a respin option is available for the player 112 (e.g., based on the subscription service data structure, etc.), the subscription management instruction set 136 may cause the gaming device 108 to render an offer (e.g., in the form of a pop-up window, illuminated pixels, etc.) to a display device of the gaming device 108. The offer may include information retrieved by the subscription management instruction set 136 from one or more of the player profile database 148 and the subscription database 152 as described herein. In some embodiments, the subscription management instruction set 136 may interact, or run concurrently with, the gaming device management instruction set 140 to cause the gaming device 108 to include one or more game enhancement features in respin and game continuation opportunities.

The subscription management instruction set 136 may enable the subscription service server 116 to manage one or more data fields for an enrollment register associated with a player 112, for example, stored in the subscription database 152. The subscription management instruction set 136 may cause a gaming device 108 to update a subscription service level for the player 112 within the gaming device 108 used by the player 112. In one embodiment, the subscription service server 116 may be configured to create one or more enrollment registers (e.g., subscription information data structures) for a player 112 within the subscription database 152. The enrollment register may include a time of enrollment, a subscription service level the player 112 is enrolled in, available offers, a history of offers accepted and the results of the offers accepted, and/or the like. In some embodiments, the subscription management instruction set 136 may be responsible for managing or updating electronic records of all players 112 within the enhanced feature gaming system 100 or a subset of players 112 within the enhanced feature gaming system 100.

The gaming device management instruction set 140, when executed by the processor 120, may control one or more features of the gaming devices 108 based on the subscription service information (e.g., associated with a player 112 in the subscription information data structure, etc.) and/or in response to input provided by a player 112 at the gaming device 108. In some embodiments, these instructions and control may be made on the gaming device 108. For instance, the control of the one or more features of the gaming devices 108 does not necessarily have to be communicated to the subscription service server 116 or the gaming device management instruction set 140 running on the subscription service server 116. In some embodiments, the gaming device management instruction set 140 may also be configured to track a status of game enhancement feature offers accepted by a player 112. For instance, the gaming device management instruction set 140 may determine whether a player 112 of a specific gaming device 108 has accepted an offer to activate one or more game enhancement features for a respin in game played on the gaming device 108. Additionally or alternatively, the gaming device management instruction set 140 may store an outcome of games played and/or results of accepted offers in one or more data structures (e.g., stored in the player profile database 148 and/or the subscription database 152, etc.). on an event or on a particular outcome of the event. In some embodiments, when an offer to activate an enhanced game feature has been accepted for a respin but the result of the respin is less than a predetermined win amount (e.g., payout amount), the gaming device management instruction set 140 may instruct the gaming device 108 to render a subsequent offer for game continuation (e.g., including the same or different game enhancement features, etc.).

The gaming device management instruction set 140 may enable the subscription service server 116 to manage one or more data fields for a player profile associated with a player 112, for example, stored in the player profile database 148. In some embodiments, the gaming device management instruction set 140 may cause a gaming device 108 to update an appropriate credit meter for the player 112 within the gaming device 108 used by the player 112. In some embodiments, the subscription service server 116 may be configured to create one or more player profiles and associated data structures within the player profile database 148. A player profile, in some embodiments, may include player 112 identification information and a wager account record (e.g., wager information, credit available, etc.) for the player 112. In some embodiments, the gaming device management instruction set 140 may be responsible for managing or updating electronic records of all players 112 within the enhanced feature gaming system 100 or a subset of players 112 within the enhanced feature gaming system 100.

The enhanced feature gaming system 100 may comprise a gaming server 144 that is separate from the subscription service server 116, and that manages a gaming behavior of one or more of the gaming devices 108 in the system 100. Similar to the subscription service server 116, the gaming server 144 may comprise a processor 120, memory 124, and a network interface 128. Although described as a separate server, the functions of the gaming server 144 may be performed by the gaming device management instruction set 140 of the subscription service server 116.

Figure 2:
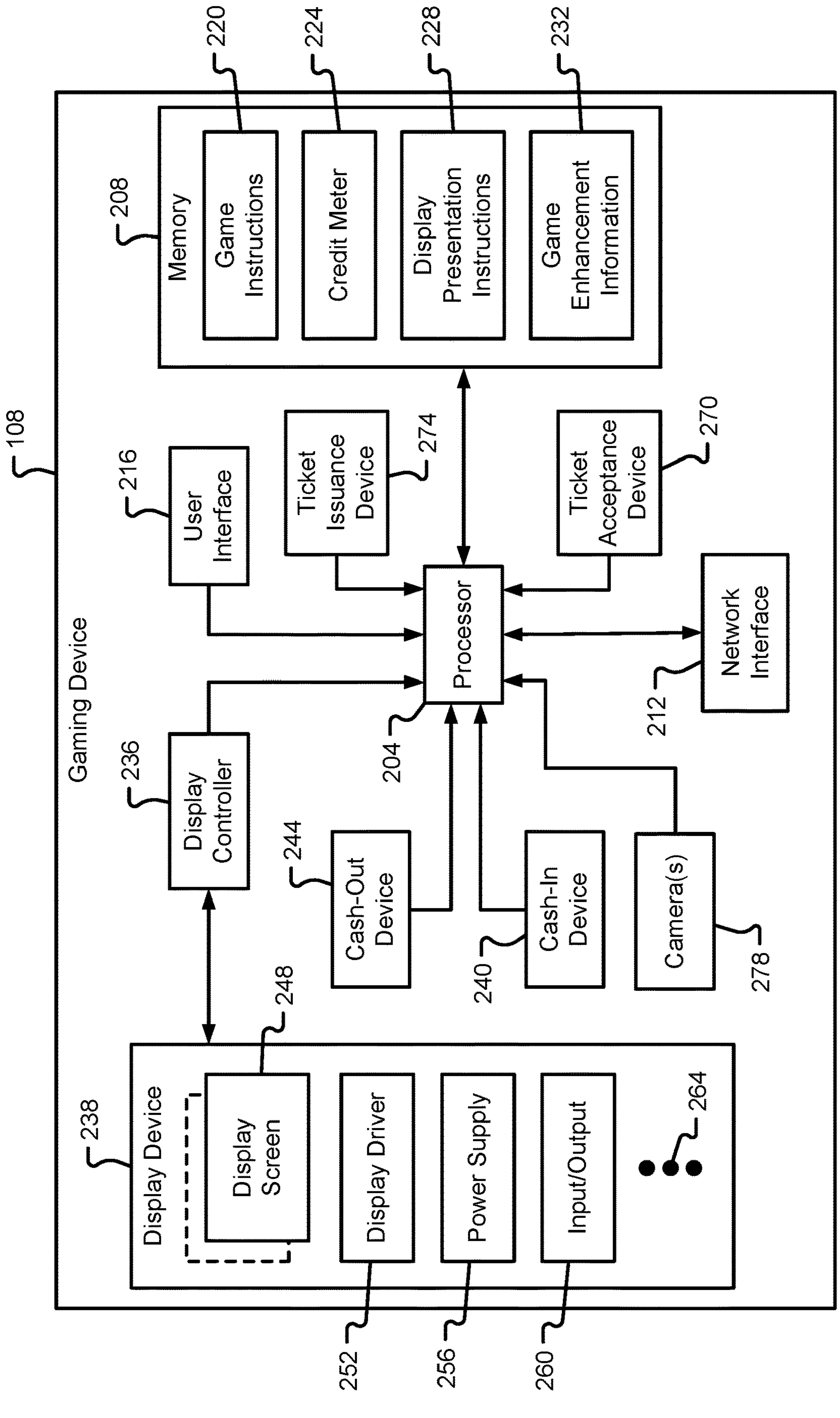
FIG. 2 is a block diagram depicting an illustrative gaming device that selectively enables enhanced gaming features for an identified player.

With reference now to FIG. 2, additional details of a gaming device 108 will be described in accordance with at least some embodiments of the present disclosure. While depicted as a gaming device 108, it should be appreciated that some or all of the components of a single gaming device 108 may be distributed across multiple gaming devices 108 (of the same or different type) without departing from the scope of the present disclosure.

The gaming device 108 is depicted to include a processor 204, memory 208, a network interface 212, a user interface 216, a display controller 236, a display device 238, a cash-in device 240, a cash-out device 244, a ticket acceptance device 270, a ticket issuance device 274, and one or more cameras 278. In some embodiments, the processor 204 may be similar or identical to the processor 120. In other words, the processor 204 may correspond to one or many microprocessors, CPUs, microcontrollers, or the like. The processor 204 may be configured to execute one or more instruction sets stored in memory 208.

The network interface 212 may also be similar or identical to network interface 128. The nature of the network interface 212, however, may depend upon whether the network interface 212 is provided in a gaming device 108 or a mobile device 142. Examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure. In some embodiments, the network interface 212 may include different communications ports that interconnect with various input/output lines.

The user interface 216 may correspond to any type of input and/or output device that enables the player 112 to interact with the gaming device 108. As can be appreciated, the nature of the user interface 216 may depend upon the nature of the gaming device 108. For instance, if the gaming device 108 includes a slot machine game, then the user interface 216 may include one or more reels, or virtually rendered reels, with symbols provided thereon, one or more lights or LED displays, one or more depressible buttons, a lever or "one armed bandit handle," a speaker, or combinations thereof. If the gaming device 108 is a digital or mobile device 142, then the user interface 216 may include one or more touch-sensitive displays, LED/LCD display screens, buttons, switches, etc.

The memory 208 may be similar or identical to memory 124. For instance, the memory 208 may include one or multiple computer memory devices that are volatile or non-volatile. The memory 208 may be configured to store instruction sets that enable player 112 interaction with the gaming device 108, that enable game play at the gaming device 108, and/or that enable coordination with the subscription service server 116. Examples of instruction sets and information that may be stored in the memory 208 include a game instruction set 220, a credit meter 224, a display presentation instruction set 228, game enhancement information 232, and/or other instruction sets.

In some embodiments, the game instructions 220, when executed by the processor 204, may enable the gaming device 108 to facilitate one or more games of chance and produce interactions between the player 112 and the game of chance. In some embodiments, the game instructions 220 may include subroutines that present one or more graphics to the player 112 via the user interface 216, subroutines that calculate whether a particular game wager has resulted in a win or loss during the game of chance, subroutines for determining payouts for the player 112 in the event of a win, subroutines for exchanging communications with a connected server (e.g., subscription service server 116, the gaming server 144, or the like), subroutines for enabling the player 112 to engage in a game using their mobile device 142, and any other subroutine or set of instructions that facilitate gameplay at or in association with the gaming device 108.

The credit meter 224 may correspond to a data structure within the gaming device 108 that facilitates a tracking of activity at the gaming device 108. In some embodiments, the credit meter 224 may be used to store or log information related to various player 112 activities and events that occur at the gaming device 108. The types of information that may be maintained in the credit meter 224 include, without limitation, player information, available credit information, wager amount information, and other types of information that may or may not need to be recorded for purposes of accounting for wagers placed at the gaming device 108 and payouts made for a player 112 during a game of chance played at the gaming device 108. In some embodiments, the credit meter 224 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the credit meter 224 may be updated in response to outcomes of a game of chance played at the gaming device 108. In some embodiments, the credit meter 224 may be updated depending upon whether the gaming device 108 is issuing a ticket/voucher, being used as a point of redemption for a ticket/voucher, and/or any other activity associated with a ticket/voucher. Some or all of the data within the credit meter 224 may be reported to the subscription service server 116, for example, if such data applies to a centrally-managed game and/or a status of a ticket/voucher. As an example, the number, value, and timing of wagers placed by a particular player 112 and payouts on such wagers may be reported to the subscription service server 116.

The display presentation instruction set 228, when executed by the processor 204, may enable the gaming device 108 to provide various display and/or auditory presentations for a game played on the gaming device 108, and/or images rendered via the display device 238 of the gaming device 108. For instance, the display presentation instruction set 228 may render one or more alerts, pop-up windows, player-selectable options, interactive windows, alarms, winning graphics, flashing lights, losing graphics, etc. via the display device 238 of the gaming device 108.

The game enhancement instruction set 232, when executed by the processor 204, may enable the gaming device 108 to activate one or more game enhancement features to activate during a respin, or game continuation. The game enhancement features may include, but are in no way limited to, a reel-lock option, a selected-reel spin option, a position-lock option, a selected-position spin option, a modified symbol option (e.g., activating a wild symbol, a bonus symbol, or any other symbol, etc.), and a score multiplier option, to name a few. The reel-lock option may allow a player 112 to select a particular reel of a plurality of reels in a reel-spin game to lock for a respin while allowing the other reels of the plurality of reels to spin (e.g., change) during the respin. The selected-reel spin option may allow a player 112 to select a particular reel of a plurality of reels in a reel-spin game to spin for a respin while locking the other reels of the plurality of reels (e.g., preventing the other reels from spinning, or changing) during the respin. The position-lock option may allow a player 112 to select a particular position in a plurality of positions in a reel-spin game to lock for a respin while allowing the other positions of the plurality of positions to spin (e.g., change) during the respin. The selected-position spin option may allow a player 112 to select a particular position of a plurality of positions in a reel-spin game to spin for a respin while locking the other positions of the plurality of positions (e.g., preventing the other positions from spinning, or changing) during the respin. The modified symbol option may allow a player to add, for example, a wild symbol or a bonus symbol to at least one of a position, reel, or pay line in a respin of the reel-spin game. Once the respin is performed, the modified symbol may change to a best possible outcome (e.g., best payout) given the other symbols associated with a pay line after the respin. By way of example, a player 112 may select the modified symbol option as a game enhancement feature for a particular reel in a respin. Continuing this example, the respin may produce a result of four out of five matching characters in positions along a pay line (e.g., in a five-reel game), with the modified symbol falling on the remaining position. In this case, the modified symbol may change from a modified symbol to correspond to a fifth matching character along the pay line. Accordingly, the payout of the respin is automatically improved from a four-character match to a five-character match. As can be appreciated, this modified symbol option provides a higher win probability associated with the reel-spin game than if the modified symbol (e.g., a wild symbol, bonus symbol, etc.) was not included as a game enhancement feature. The score multiplier option may allow a player 112 to multiply a payout amount associated with the respin, as long as the respin produces a winning result. Score multipliers may be associated with any scalar value that, when multiplied by the payout amount of a result, increases the payout amount some positive value. Other game enhancement features may be activated by the game enhancement instruction set 232 in response to acceptance by a player 112 of the gaming device 108.

The gaming device 108 may include one or more display devices 238 configured to render information, live video, communications windows, wagering interface windows, games, interactive elements, and/or other visual output to one or more display screens 248. The gaming device 108 may include one or more display controllers 236 configured to control an operation of the display device 238. This operation may include the control of input (e.g., player 112 input via the user interface 216, command input via the instruction sets in memory 208, combinations thereof, etc.), output (e.g., display, rendered images, visual game behavior, etc.) and/or other functions of the display device 238.

The display device 238 may comprise one or more display screens 248 that are configured to selectively activate pixels and/or display elements to render one or more games, windows, indicators, interactive elements, icons, characters, lights, images, etc. Examples of the display screen 248 may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens 248 may be separated into a main display and a secondary display. In a gaming device 108 context, the main display may correspond to a display arranged in a first viewing position of a player 112 and the secondary display may correspond to a display arranged in a second (e.g., higher) viewing position of the player 112. It is an aspect of the present disclosure that the gaming device 108 may include any number of display screens 248 in any arrangement or orientation (e.g., stacked, side-by-side, staggered, overlapped, angled, and/or combinations thereof). In some embodiments, the display device 238 may be configured to render information in one or more discrete areas (e.g., windows, portions, zones, backgrounds, etc.) of the display screen 248 or superimposed in an area of the display screen 248.

The display device 238 may include a display driver 252, a power supply 256, an input/output 260, and/or other components 264 configured to enable operation of the display device 238. The display driver 252 may receive commands and/or other data provided by the processor 204 and one or more of the instruction sets in memory 208. In response to receiving the commands, the display driver 252 may be configured to generate the driving signals necessary to render the appropriate images to the display screen 248. The power supply 256 may provide electric power to the components of the display device 238. In some embodiments, the power supply 256 may include a transformer and/or other electronics that prevent overloading, condition power signals, and/or provide backup power to the display device 238. The input/output 260 may correspond to one or more connections for receiving or exchanging information and/or video from components of the gaming device 108.

The input/output 260 may include an interconnection to the network interface 212. For example, the input/output 260 may include a high-definition multimedia interface (HDMI) input, Ethernet, composite video, component video, H.264, or other video connection.

The cash-in device 240 may include a bill acceptor, a coin acceptor, a chip acceptor or reader, or the like. In some embodiments, the cash-in device may also include credit card reader hardware and/or software. The cash-out device 244, like the ticket issuance device 270, may operate and issue cash, coins, tokens, or chips based on an amount indicated within the credit meter 224. In some embodiments, the cash-out device 244 may include a coin tray or the like and counting hardware configured to count and distribute an appropriate amount of coins or tokens based on a player's 112 winnings or available credit within the credit meter 224.

Because the gaming device 108 may be used for the acceptance and issuance of tickets/vouchers, the gaming device 108 may be provided with appropriate hardware to facilitate such acceptance and issuance. Specifically, the gaming device 108 may be provided with a ticket acceptance device 270 that is configured to accept or scan physically-printed tickets/vouchers and extract appropriate information therefrom. In some embodiments, the ticket acceptance device 270 may include one or more machine vision devices (e.g., a camera, IR scanner, optical scanner, barcode scanner, etc.), a physical ticket acceptor, a shredder, etc. The ticket acceptance device 270 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's 112 mobile device 142, for example. In one embodiment, an impersonal player ID may be present on the electronic ticket/voucher as part of the barcode, QR code, or other visible information on the electronic ticket/voucher.

The ticket issuance device 274 may be configured to print or provide physical tickets/vouchers to players 112. In some embodiments, the ticket issuance device 274 may be configured to issue a ticket/voucher consistent with an amount of credit available to a player 112, possibly as indicated within the credit meter 224.

The gaming device 108 may include at least one camera 278, or image capture device, that is configured to capture still and/or video images in proximity to the gaming device 108. The camera 278 may include, or be associated, with additional devices, such as light sources, flashes, infrared emitters, etc., to provide a clear image capture environment. In one embodiment, the cameras 278 may read a card (e.g., including a QR code, barcode, visual indicia, etc.), or ticket, presented by the player 112. The information on the card, or ticket, may identify the player 112 to the gaming device 108 and the subscription service server 116. In one embodiment, the cameras 278 may identify a player 112 based on visual feature recognition associated with the player 112. As provided herein the camera 278 may be controlled by the processor 204 in conjunction with signals from the subscription service server 116, the game enhancement instruction set 232, and/or other instruction sets in memory 208. In some embodiments, a player 112 may be identified by information stored on a game or tracking card such as biometric information of the player 112 (e.g., iris data, retina data, fingerprint data, facial data, and/or other data that is capable of uniquely identifying the player 112), and/or a link or memory storage location data that identifies information for the player 112 stored in the player profile database 148 (e.g., in the player information field 304, etc.). This card may be received and read by the ticket acceptance device 270 and/or the camera 278. In one embodiment, the ticket acceptance device 270 may receive the card, read the information stored thereon, and the processor 204 may instruct the camera 278 to obtain live images, or other image data, of the player 112 to compare to the information read from the card or retrieved from the player profile database 148. Additionally or alternatively, a player 112 may be identified using at least one of a connected computing device (e.g., a player's mobile device 142, smart watch, etc.), based on login credentials entered by a player 112 (e.g., username, password, unlock pattern, personal identification number (PIN), etc., associated with the player 112), social media login or authentication information (e.g., the Facebook, Google, Twitter, etc.), OAuth data, and/or other methods of two-factor authentication.

Figure 3A:
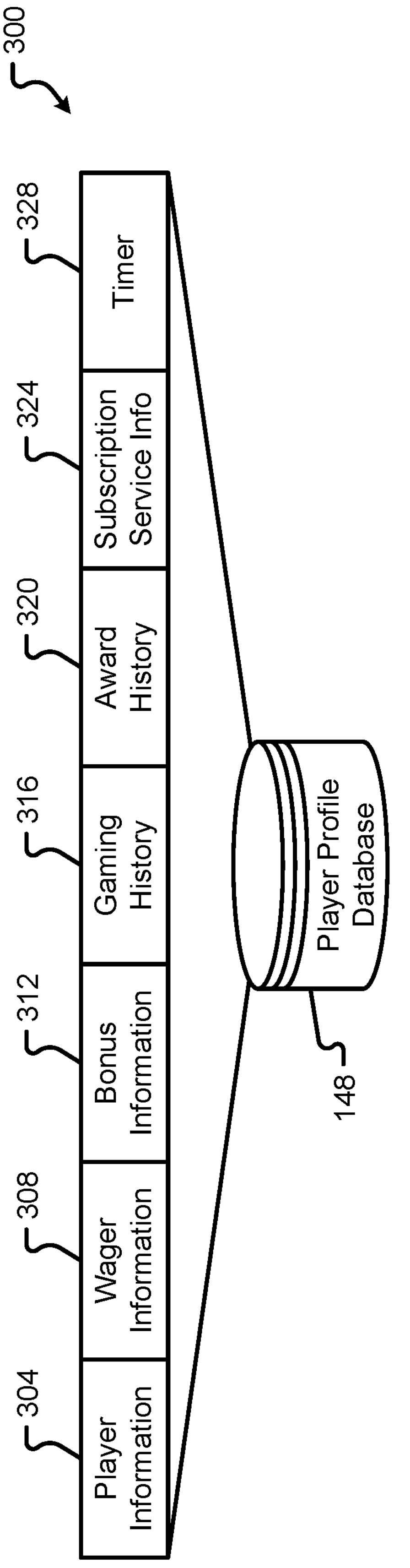
FIG. 3A is a block diagram depicting a player information data structure stored in a player profile database for determining information about players interacting with a gaming device of the gaming system.
Figure 3B:
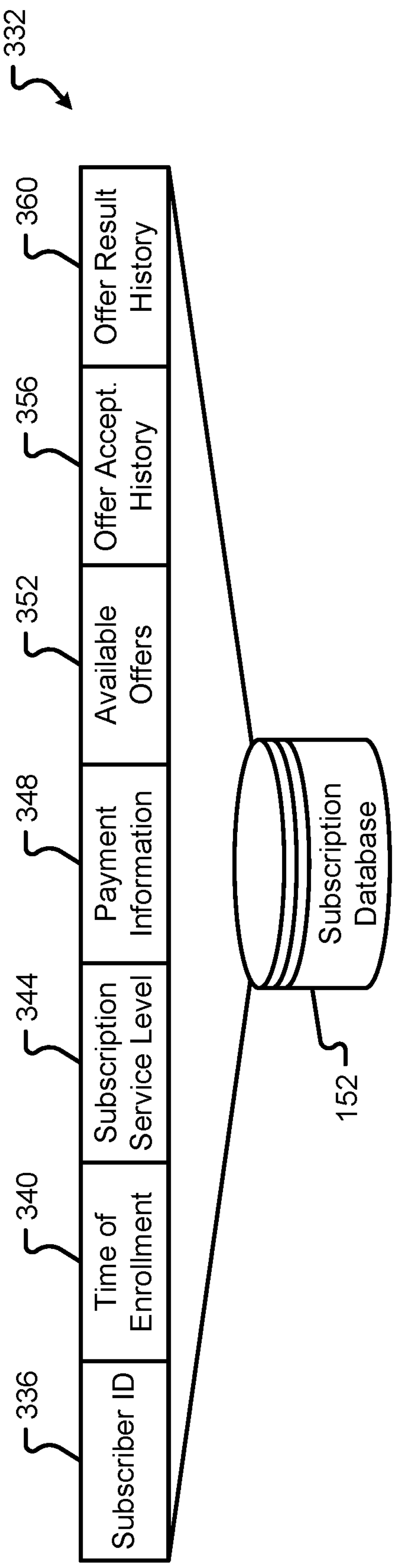
FIG. 3B is a block diagram depicting a subscription information data structure stored in a subscription database for determining respin options for a player interacting with a gaming device and enrolled with a subscription service of the gaming system.

With reference now to FIGS. 3A and 3B, additional details of data structures that are useable in connection with managing player profiles and enrollment registers (e.g., subscription service profiles) will be described in accordance with at least some embodiments of the present disclosure. It should be appreciated that the data structures depicted and described herein may be stored within a central database or may be distributed among a number of data storage nodes. Additionally or alternatively, some or all of the fields of the data structures may be maintained in devices of the enhanced feature gaming system 100 such as the subscription service server 116, a gaming server 144, and/or a gaming device 108 (e.g., a mobile device 142, etc.) without departing from the scope of the present disclosure.

With reference initially to FIG. 3A, details of a data structure 300 that may be maintained as part of a user, or player, profile will be described in accordance with at least some embodiments of the present disclosure. The database 148 may be configured to store one or multiple data structures 300 that are used in connection with tracking player progress, wager history, and gaming activity. As a non-limiting example, the data structure 300 may be used to store wagers made, player history information, and the like. Even more specifically, the data structure 300 may include a plurality of data fields that include, for instance, player information field 304, a wager information field 308, a bonus information field 312, a gaming history field 316, an award history field 320, an aggregate activity field 324, and a timer field 328.

The player information field 304 may be used to store any type of information that identifies a player 112 or a group of players 112. In some embodiments, the player information field 304 may store one or more of username information for a player 112, password information for a player account, player status information, accommodations associated with the player 112, and any other type of customer service management data that may be stored with respect to a player 112. The player information field 304 may store biometric or feature identification information about a player 112. In one embodiment, the cameras 278 may record features of a player 112 and compare the features to the identification information stored in the player information field 304 to positively identify one player 112 from another in the enhanced feature gaming system 100. Additionally or alternatively, the player information field 304 may store the player's 112 favorite games, favorite gaming devices 108, and/or other preferences associated with the player 112. In some embodiments, the player information field 304 may include a player type associated with the player 112. The player type may define a playing behavior of the player 112 over time. For instance, the player type may define the player as a "high roller" when the player historically places large bets, or wagers, on game outcomes, places a number of bets totaling a predetermined amount in a given period of time, etc. Additionally or alternatively, the player type may define the player 112 as a "frequent player" based on a number of games played per minute, per day, per week, etc. reaching a predetermined games-played rate. In some embodiments, the player type may define the player 112 as a "variety player" based on the player 112 playing a predetermined number of different types of games over time. In one embodiment, the player 112 may be defined by a combination of player types stored in the player information field 304.

The wager information field 308 may be used to store data about a player's 112 available credit with a casino, wagers made when playing particular games in a casino, and/or other wagering information for the player 112. In one embodiment, the wager information field 308 may store an electronic record of available credit in the player's 112 account and whether any restrictions are associated with such credit. The wager information field 308 may further store information describing a player's 112 available credit over time, cash out events for the player 112, winning events for the player 112, and the like. In some embodiments, the wager information field 308 may store information describing amounts won and/or lost from wagering on games, amounts won and/or lost from playing a game of the gaming device 108, and/or other betting information associated with the player 112.

The bonus information field 312 may be used to store information describing bonuses that have been paid to the player 112 or that are available to be paid in response to wagers placed by the player 112 on an outcome of a game. As a non-limiting example, the bonus information field 312 may be used to store electronic records for values of awards that are available to or have been paid to the player 112. Even more specifically, the bonus information field 312 may store values of awards that will be paid to the player 112 if a particular game result, or outcome, occurs within a predetermined amount of time (as monitored by a timer value in the timer field 328) and to store a value of an award that will be paid to the player 112 if a plurality of game results, or outcomes, occur. The bonus information field 312 may also be used to store probability information or odds associated with a particular game result, or outcome, occurring or a plurality of particular results, or outcomes, occurring. In one embodiment, the bonus information field 312 may include information about which bonus opportunities a player 112 has registered for, been enrolled in, or automatically entered based on playing one or more games on gaming devices 108.

The gaming history field 316 may be used to store historical data for games played by a player 112 over time. The historical data may include a number of games played over time, a number of different types of games (e.g., slot games, card games, matching games, etc.) played over time, number of sequential games played for a particular type of game or gaming device 108, and/or the like. Among other things, the information in the gaming history field 316 may be used to determine the player type of the player 112. Based on the gaming history field 316, the subscription service server 116 may suggest (e.g., causing an enrollment offer to be rendered by the gaming device 108) that the player 112 enroll in a subscription services enrollment register at a particular subscription service level.

The award history field 320 may store data related to awards, bonuses, mini-bonuses, score multipliers, jackpots, etc., granted to the player 112. The award history field 320 may also indicate when such awards were granted to the player 112, whether the awards have been redeemed, whether the awards are being funded by a game of chance or skill, a mini-bonus associated with an outcome of a game, or a jackpot award associated with the player 112 completing a plurality of events in a gaming session. In some embodiments, the award history field 320 may comprise data regarding losses associated with the player 112. For instance, the award history field 320 may be used to track amounts lost, amounts won, and/or draws associated with one or more bets in which the player 112 participated. The information in the award history field 320 may be used by the subscription service server 116 and/or a gaming device 108 to determine a wagering behavior and/or player type of a particular player 112. For example, the subscription service server 116 may determine based on the information in the award history field 320 that a particular player 112 is a "high roller" player, for example, who routinely places large bets on games, etc. In response, the subscription service server 116 may determine respin options for the player 112 that allow the player 112 to activate game enhancement features that increase a payout amount for subsequent winning respins in a reel-spin game, for example.

The subscription service information field 324 may be used to store a status of a player's 112 enrollment with a subscription service. In some embodiments, the information in the subscription service information field 324 may comprise a binary identifier used to indicate that the player 112 is enrolled in a subscription service enrollment register (e.g., using a "1" identifier, or the like) or that the player 112 is not currently enrolled in a subscription service enrollment register (e.g., using a "0" identifier, or the like). In one embodiment, the information in the subscription service information field 324 may comprise a link, or uniform resource locator (URL), to an information field of an enrollment register for the player 112 stored in a subscription database 152 (e.g., when the player 112 is enrolled with a subscription service). Upon identifying a player 112, the subscription service server 116 may refer to the subscription service information field 324 to determine a memory location of the player's 112 subscription service information. This determination may include accessing the memory location via the link in the subscription service information field 324 of the player information data structure 300.

As discussed above, the timer field 328 may be used to store a timer value associated with tracking whether or not a particular player 112 has played a game at a particular time or won a wager on a game within a predetermined amount of time. The value of the timer within the timer field 328 may count up, count down, or increment in any known way to track a passage of time. Alternatively or additionally, time may be measured by a number of games played in the enhanced feature gaming system 100 rather than being measured absolutely. Thus, the timer does not necessarily have to count a passage of time with seconds and minutes, but rather may be counting a passage of time based on a number of games played or other gaming incidents that occur within the system 100. Such information may be maintained within the timer field 328.

FIG. 3B shows details of another data structure 332 that may be used within the enhanced feature gaming system 100 in accordance with at least some embodiments of the present disclosure. In particular, a subscription information data structure 332 corresponding to an enrollment register for a player 112 with a subscription service is illustrated in FIG. 3B. The database 152 may be configured to store one or multiple data structures 332 that are used in connection with tracking player subscription status and history. In one embodiment, the subscription information data structure 332 may include a plurality of data fields that include, but are in no way limited to, a subscriber ID field 336, a time of enrollment field 340, a subscription service level field 344, a payment information field 348, an available offers field 352, an accepted offers field 356, and a result history field 360.

The subscriber ID field 336 may be used to store a subscriber identification for the player 112. The subscriber identification may correspond to a unique value assigned to a particular player 112 that differentiates one player 112 from another in the subscription database 152. Once a player 112 registers, or enrolls, with the subscription service server 116 the subscriber identification may be created by the subscription service server 116 for the player 112. Information related to the enrollment of the player 112 may be associated with this subscriber identification stored in the subscriber ID field 336.

The time of enrollment field 340 may be used to store a time associated with the enrollment of the player 112 with the subscription service server 116 and subscription services provided via the subscription service server 116. The time of enrollment field 340 may include a time of enrollment, a time of termination of enrollment, a time (e.g., length of time, or duration, etc.) the player 112 was enrolled with the subscription service server 116 at a particular subscription service level, a time of enrollment for a particular subscription service level, and/or other timing information associated with the enrollment of the player 112.

The subscription service level field 344 may be used to store information corresponding to a paid-for level of subscription service for the player 112 identified in the subscriber ID field 336. In some embodiments, the enhanced feature gaming system 100 may provide various respin options to players 112 depending on the player's subscription service level. For example, a first level subscription may provide a first number of game enhancement features that a player 112 can activate for a respin, a second level subscription may provide a second number of game enhancement features that a player 112 can activate for a respin that is greater than the first number, and a third level subscription may provide a third number of game enhancement features that a player 112 can activate for a respin that is greater than the first and/or the second number. The subscription service server 116 may refer to the subscription service level field 344 of the subscription information data structure 332 to determine respin options for a player 112. In some embodiments, a player 112 may pay more money (e.g., in the form of cash, credits, etc.) to increase from a lower level subscription (e.g., a first level subscription, etc.) to a higher level subscription (e.g., a second level subscription, third level subscription, etc.). Additionally or alternatively, a player 112 may pay less money (e.g., in the form of cash, credits, etc.) to decrease from a higher level subscription (e.g., a third level subscription, second level subscription, etc.) to a lower level subscription (e.g., a first level subscription, etc.).

The payment information field 348 may be used to store data about payments made by the player 112 associated with the enrollment of the player 112 with the subscription service server 116. The payments may define a single payment or recurring payments made by the player 112 over time. In some embodiments, the data in the payment information field 348 may define a cost associated with each respective subscription service level (e.g., stored in the subscription service level field 344). When a respin option is determined to be available for a player 112, the subscription service server 116 may refer to the subscription service level field 344 to determine a current subscription service level for the player 112 and the payment information field 348 to determine whether a payment may be made to upgrade the player 112 to a higher subscription service level and, for instance, an increased number of game enhancement features.

The available offers field 352 may be used to store information about offers for activating game enhancement features for players 112 based on the player's 112 current subscription service level and previous game outcome. As provided above, various subscription service levels may allow different game enhancement features to be activated by the gaming device 108 during a respin. Once a player 112 has played a first game (e.g., a reel-spin game) of a gaming device 108, the subscription service server 116 may determine that offers are available for the player 112 by referring to the available offers field 352 in the subscription information data structure 332. The available offers field 352 may include a win probability associated with each game enhancement feature. The win probability may correspond to a percentage chance that the respin including the game enhancement feature will result in a win. Activating any of the game enhancement features on a respin increases the percentage chance that the respin will result in a win over a respin that did not include the game enhancement features. The win probabilities may vary from one game enhancement feature to another. In one embodiment, the win probabilities may comprise combined game enhancement feature win probabilities defining a win probability when more than one game enhancement feature is activated on a respin. An offer to activate a particular game enhancement feature may include a cost associated therewith. For instance, a first game enhancement feature having a first win probability may cost a first amount and a second game enhancement feature having a second, higher, win probability may cost a second, higher, amount than the first amount. In some cases, as a player 112 selects multiple game enhancement features to activate together in a respin, the cost associated with doing so increases. Stated another way, as the win probability increases by adding game enhancement features so may the cost of activating the game enhancement features. This increase in cost may be proportionate to the number of game enhancement features activated and/or the overall win probability calculated including all of the game enhancement features together in a respin. The available offers field 352 may include offers that are time-limited or purpose-limited. For instance, certain offers may only be available to a player 112 for a limited amount of time and/or for a particular game or games. The activation or availability of a game enhancement feature may be time-limited to a user with an active membership (e.g., a paid-for level of subscription service, etc.). Time-limited offers may define a number of activations, of game enhancement features, that are available to the player 112 within a defined time period (e.g., during a membership season, day, week, month, year, etc.). Additionally or alternatively, the time-limited offers may define a number of activations that are available to the player 112 for an amount of gaming time (e.g., a time of a gaming session, a particular number of games, a number of games within a certain time period, etc.). In one embodiment, the time may be monitored by a timer value in the timer field 328. Purpose-limited offers may define activations of game enhancement features that are available to a player 112 for a particular game, feature in a game, bonus game, bonus play-off, free game, etc. The time-limited and/or purpose-limited offers may include game enhancement features that are available to a player 112 regardless of the type of game. Stated another way, the game enhancement features may not just be available to a player 112 during a base game.

In some embodiments, a respin option may not be available for a player 112 because there is no opportunity to improve the payout amount from the previous spin. For instance, the payout amount for the previous game may be greater than a predetermined amount that would enable a respin option. In this instance, no offer would be available to the player 112 to activate one or more game enhancement features in the respin. Available offers may be rendered to a display device 238 of the gaming device 108 including a listing of game enhancement features and associated costs. If a particular game enhancement feature is not available to the player 112, based on a current subscription service level, the subscription service server 116 may cause a game enhancement feature to appear greyed out in the rendered offer. In some embodiments, a player 112 may upgrade a subscription service level to access the greyed out, or unavailable, game enhancement feature. Once the player 112 upgrades the subscription service level, the subscription service server 116 may update the subscription service level field 344 to reflect the new subscription service level and the available offers field 352 to increase the number of available game enhancement features for the player 112.

The accepted offers field 356 may be used to store data corresponding to offers accepted by a player 112 on a respin. As a player 112 is playing games on a gaming device 108, the player 112 may be presented with one or more offers to activate game enhancement features on a respin of a reel-spin game, or in a game continuation of some other game. After causing the gaming device 108 to render the offer, the subscription service server 116 may determine whether the player 112 has provided an input accepting or denying the offer. Among other things, the history of accepted offers may be used by the subscription service server 116 in determining a number of future offers to make to a player 112 when a respin option is determined. For example, if a player 112 does not accept any offers, over a given time period or number of games played, to activate one or more game enhancement features in respins, the subscription service server 116 may determine to cease the rendering of offers by the gaming device 108 for an amount of time, or permanently. On the other hand, if the player 112 accepts a predetermined number of offers, over a given time period or number of games played, to activate one or more game enhancement features in respins, the subscription service server 116 may cause additional offers to be rendered by the gaming device 108, allowing the player 112 more chances to win during respins.

The result history field 360 may be used to store information about outcomes of accepted offers to activate game enhancement features in respins. This information may define whether a player 112 won or lost on a respin with game enhancement features activated. In some embodiments, the information in the result history field 360 may be used to adjust a cost associated with one or more offers to activate game enhancement features in subsequent respins. For example, in the event the player 112 has lost a predetermined number of respins including the activated game enhancement features, the subscription service server 116 may provide future offers with a discounted cost for particular game enhancement features to be activated in subsequent respins. Additionally or alternatively, if the player 112 has won a predetermined number of respins including the activated game enhancement features, the subscription service server 116 may provide future offers with an increased cost for particular game enhancement features to be activated in subsequent respins.

Figure 4:
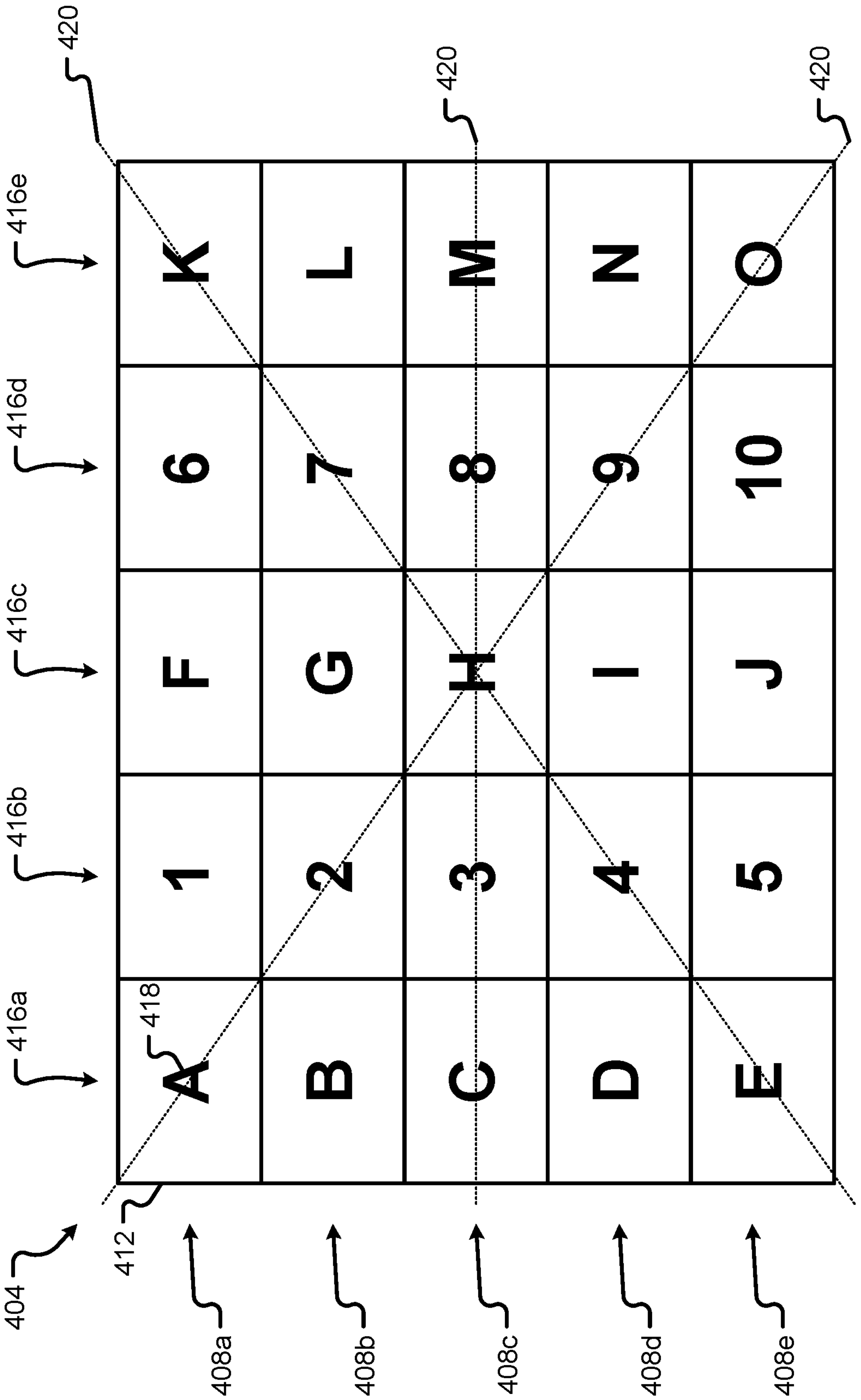
FIG. 4 is an illustrative layout of symbols within an array of symbol areas of a reel-spin game of a gaming device in the gaming system.
Figure 5A:
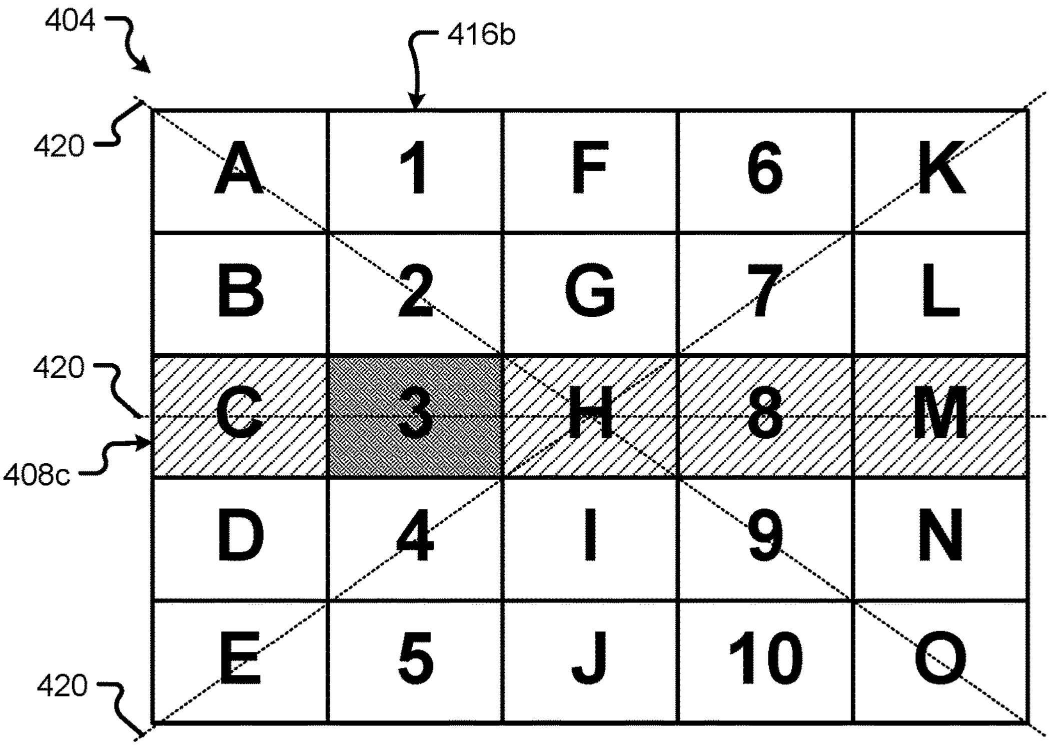
FIG. 5A illustrates a first output of a gaming device showing a first result of reel-spin game played by a player.
Figure 5B:
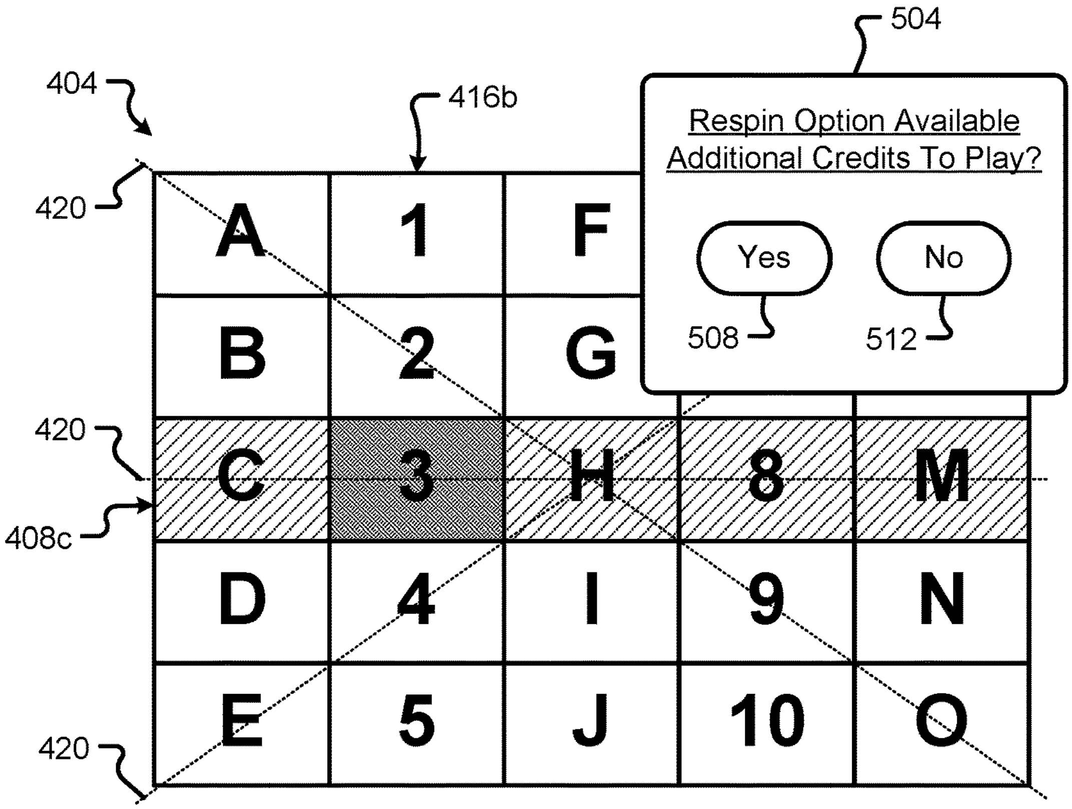
FIG. 5B illustrates a pop-up window with a player prompt providing an offer to activate game enhancement features for a respin of the reel-spin game.
Figure 5C:
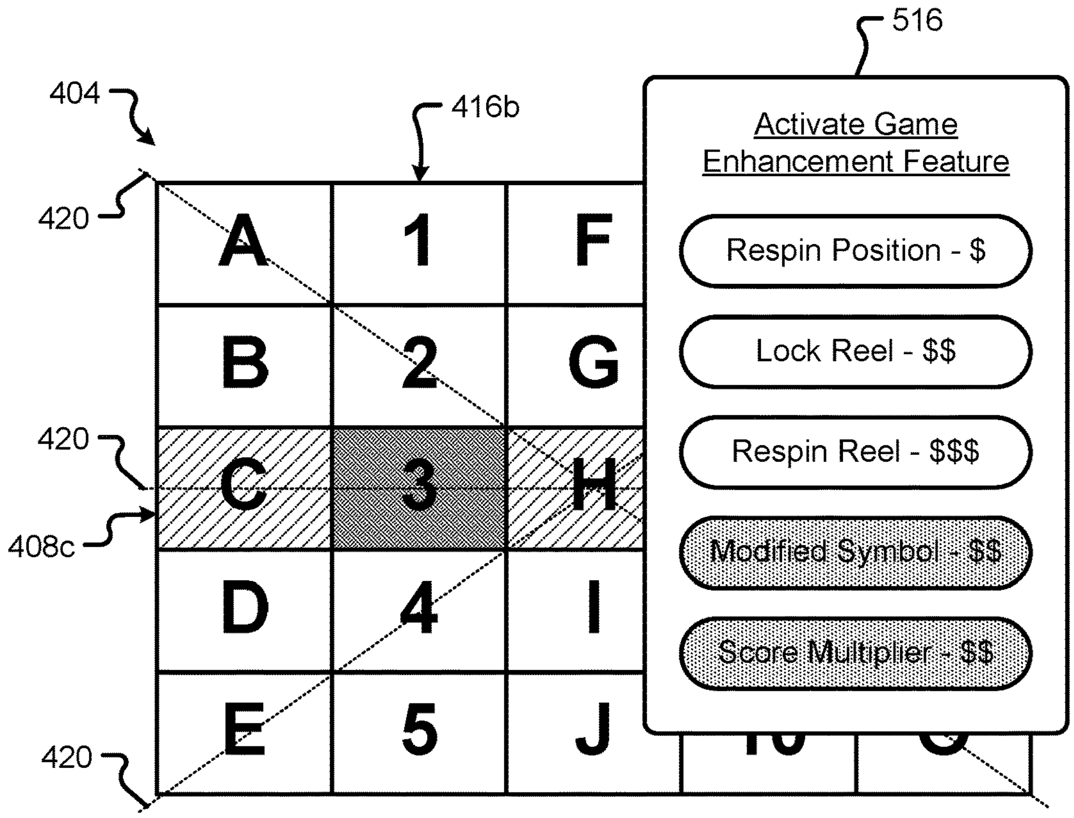
FIG. 5C illustrates a feature selection window providing a plurality of player-selectable game enhancement features to activate for the respin of the reel-spin game.
Figure 5D:
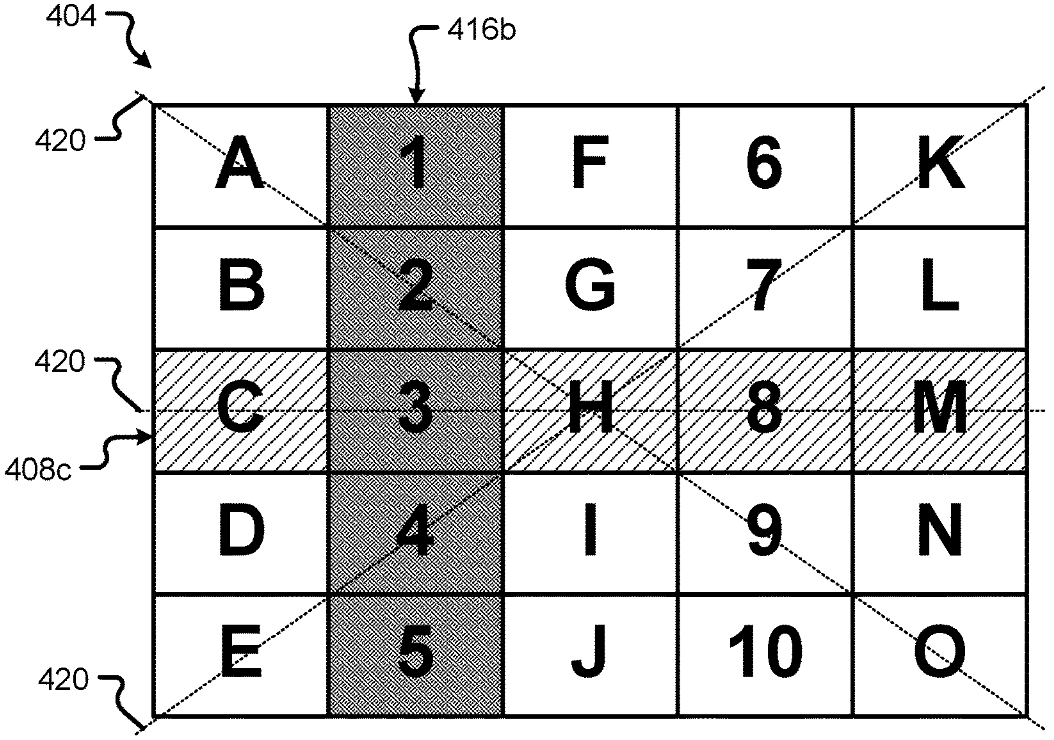
FIG. 5D illustrates a player-selected set of symbols corresponding to a particular reel of the plurality of reels in the reel-spin game to respin while locking other reels in the reel-spin game during the respin.
Figure 5E:
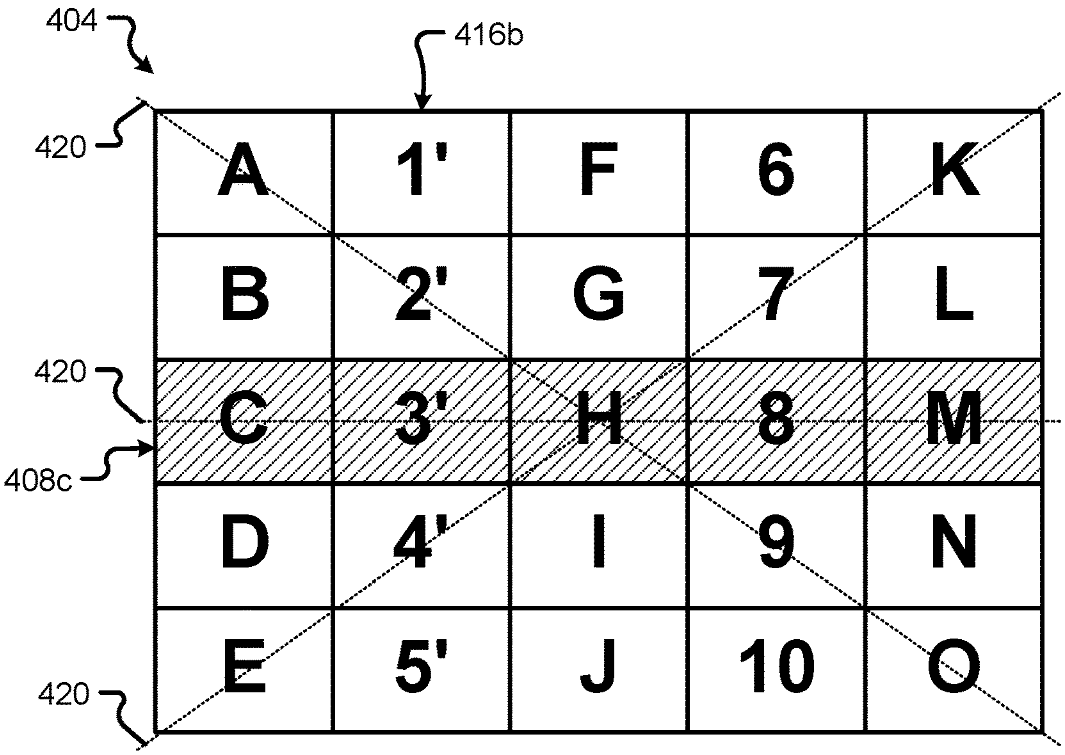
FIG. 5E illustrates a result of the respin of reel-spin game with the player-selected game enhancement feature activated locking all of the plurality of reels except the particular reel selected by the player.
Figure 5F:
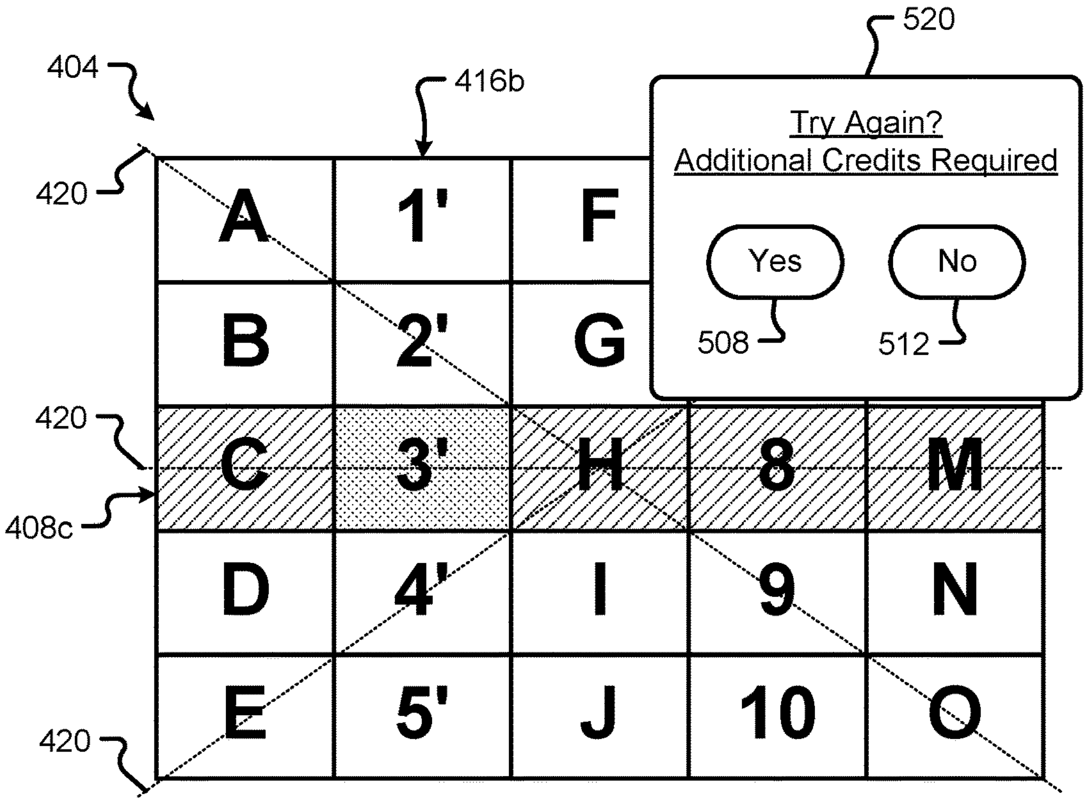
FIG. 5F illustrates a subsequent pop-up window with a player prompt providing an offer to activate subsequent game enhancement features for a subsequent respin after a result of the respin with the player-selected enhancement feature activated.
Figure 5G:
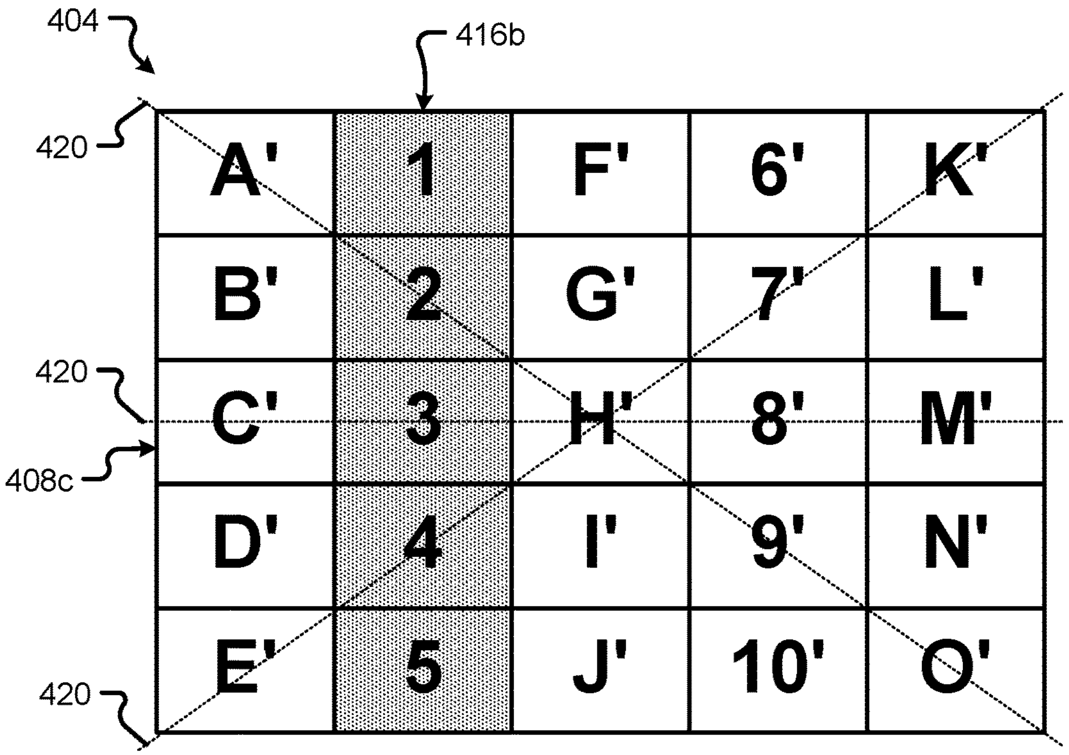
FIG. 5G illustrates a result of the respin of reel-spin game with the player-selected game enhancement feature activated locking a particular reel of the plurality of reels while all other reels in the plurality of reels are unlocked during the respin.
Figure 5H:
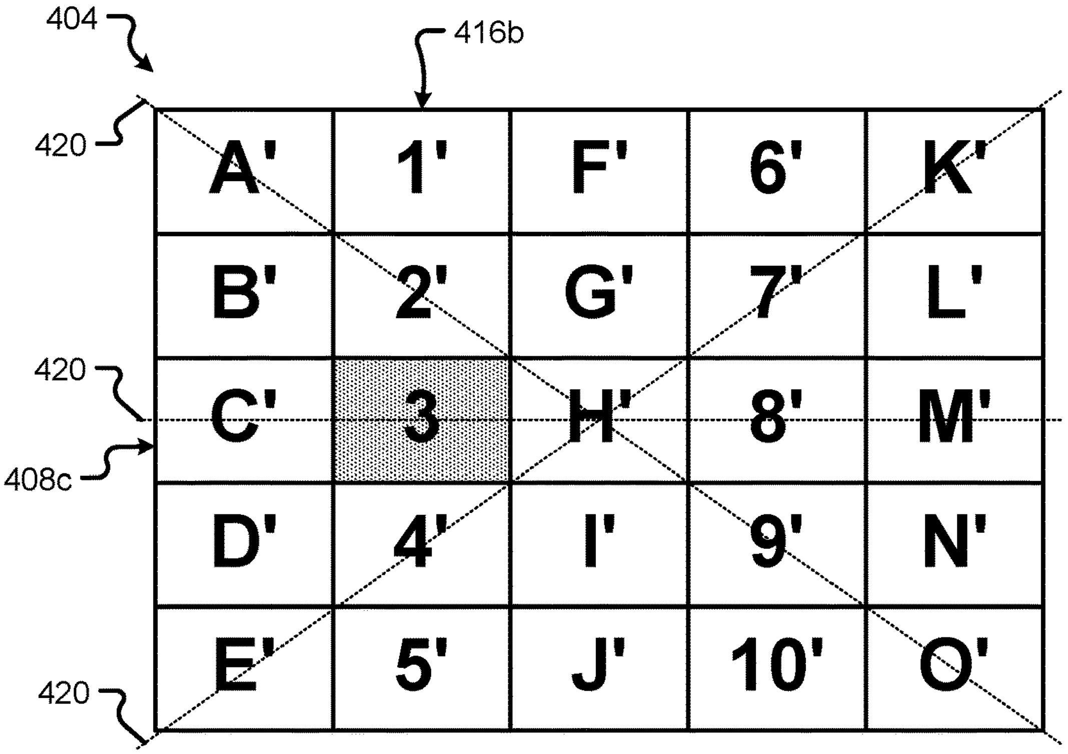
FIG. 5H illustrates a result of the respin of reel-spin game with the player-selected game enhancement feature activated locking a particular position of the plurality of reels while all other positions in the plurality of reels are unlocked during the respin.

With reference now to FIGS. 4 to 5H, various operations of the gaming device management instruction set 140, the game instruction set 220, and the game enhancement instruction set 232 will be described in accordance with at least some embodiments of the present disclosure.

Referring initially to FIG. 4, a first layout of an array of symbol areas 404 will be described in accordance with embodiments of the present disclosure. The array of symbol areas 404 may be presented with the display screen 248. In some embodiments, the game instruction set 220 may control which particular symbols 418 are presented within a particular symbol area 412. The illustrative array of symbol areas 404 is shown to include five columns 416*a*, 416*b*, 416*c*, 416*d*, 416*e* of symbol areas 412 and five rows 408*a*, 408*b*, 408*c*, 408*d*, 408*e* of symbol areas 412. Although FIG. 4 illustrates a 5×5 array of symbol areas 404, it should be appreciated that embodiments of the present disclosure can be implemented in an array of symbol areas 404 having a variety of sizes. For instance, embodiments of the present disclosure may be used in an array of symbol areas 404 that are 3×3, 3×5, 5×3, 7×3, 10×5, 10×10, etc. The example layout of the array of symbol areas 404 should not be construed as limiting embodiments of the present disclosure.

As can be seen in FIG. 4, each symbol area 412 in the array of symbol areas 404 may be populated with a single symbol 418. In other words, after the game instruction set 220 has applied a random number generator to determine symbol 418 placement throughout the array of symbol areas 404, there will be a 1:1 correlation of symbols 418 to symbol areas 412. Each column 416*a*, 416*b*, 416*c*, 416*d*, 416*e* may also be referred to as a reel, particularly in the event that the game instruction set 220 provides a reel-spin, or slot, game. If a reel-spin game is implemented, then the reels (mechanical or video) are spun (physically or virtually) and their final position after the spin is determined, at least in part, with assistance of the random number generator.

In some embodiments, payouts or other predetermined game outcomes (e.g., bonus spin opportunities, prize wins, cash wins, respin bonus play, etc.) may be determined based on a symbol combination that falls on a pay line 420 that was subject to a wager prior to the spin. In some embodiments, a plurality of the pay lines 420 may be selected for "play" prior to a spin, meaning that any pay line 420 selected for "play" will be evaluated for a predetermined symbol combination. A selected pay line 420 may also correspond to the pay line 420 that is evaluated after symbols 418 have been subjected to a respin operation and potentially symbol locking by the game instruction set 220 and/or the game enhancement instruction set 232. In some embodiments, however, it may be possible to switch or select more pay lines 420 for evaluation after a spin has completed, but before a respin operation has been performed. The addition of more pay lines 420 after the original spin but prior to the respin may require the player 112 to provide more credits to the game instruction set 220 as part of enabling evaluation over more pay lines 420.

Referring now to FIGS. 5A-5E, a first illustrative game play sequence that can be performed by the game instruction set 220 and game enhancement instruction set 232 will be described in accordance with at least some embodiments of the present disclosure. In the example of FIG. 5A, a game played on the gaming device 108 provided a first arrangement of symbols along the pay line 420 of the third row 408*c*. In particular, the symbols 418 represented by characters "C," "H," "8," and "M" are identified (e.g., including a same hatched background) as corresponding to a winning arrangement with the exception of the symbol 418 in the second column 416*b* and the third row 408*c* represented by the character "3." In a reel-spin game, the characters "C," "H," "8," and "M" may correspond to matching symbols along the horizontal pay line 420 and the character "3" may not match the other symbols along the horizontal pay line 420. The subscription service server 116 may determine that this result provides a payout amount that is less than a predetermined payout amount. For example, if the symbol represented by the character "3" matched the other symbols along the horizontal pay line 420, the payout amount would equal the predetermined payout amount. In this instance, the subscription service server 116 may determine that the result was a "near-miss win" and that a respin option is available for the player 112.

As illustrated in FIG. 5B, in response to determining that a respin option is available, a pop-up window 504 may be rendered by the display device 238, providing an offer for the player 112 to activate one or more game enhancement features. The pop-up window 504 may include a description of the offer and at least one interface element to accept or deny the offer. For instance, the pop-up window 504 comprises a description that a respin is available and additional credits will be required to play, or respin. The pop-up window 504 may include a "yes" icon 508 and a "no" icon 512 that may be selected by the player 112 to respond to the offer. In some embodiments, these icons 508, 512 may be associated with physical buttons on a gaming device 108 and/or a rendered image on the display screen 248 of the gaming device 108.

In one embodiment, the offer rendered may include a particular type of game enhancement feature that is to be activated automatically on the respin if the offer is accepted by the player 112. In some embodiments, the offer may present information to a player 112 identifying that a respin option is available and require the player 112 to accept the offer prior to selecting or providing one or more game enhancement features to be activated as part of the respin. For example, FIG. 5C shows a feature selection window 516 that is rendered by the display device 238 of the gaming device 108 in response to a player 112 accepting the offer associated with the pop-up window 504. The feature selection window 516 may provide a list of available game enhancement features for the player 112 (e.g., based on the player's 112 enrollment status with a subscription service server 116, etc.). As shown in FIG. 5C, the game enhancement features may comprise one or more player-selectable options to respin a position, lock a reel, respin a reel, add a modified symbol option, and/or add a score multiplier for the respin. Each of the player-selectable options may be associated with a cost (e.g., in cash, credits, or other currency, etc.) to activate the game enhancement feature for the respin (e.g., the next spin of the reel-spin game). Continuing the examples above, the cost to activate a particular game enhancement feature may be shown as a representative amount (e.g., the symbol "$" adjacent the option, etc.), an actual cost in credits, an actual cost in currency, and/or combinations thereof.

In some embodiments, certain game enhancement feature options may not be available to a player 112 at a current stage of the game or for the subscription service level the player 112 is currently enrolled in. In FIG. 5C, the modified symbol option and the score multiplier option are shown greyed out, or unavailable. In one embodiment, a player 112 may select one of these greyed out, or unavailable, options to prompt the subscription service server 116 to upgrade the subscription service level for the player 112. For instance, a window may be rendered by the gaming device 108 requesting information for the player 112 to increase the subscription service level from a first level to second higher level where the greyed out game enhancement feature become available. This upgrade in subscription service level field 344 may be associated with a cost (e.g., stored in the payment information field 348 of the subscription information data structure 332, etc.). In response to upgrading the subscription service level for the player 112, the subscription service server 116 may cause the gaming device 108 to render the previously unavailable options as available (e.g., not greyed out and available for selection by the player 112).

FIG. 5D shows an example where a player 112 selected a set of symbols corresponding to a particular reel of the plurality of reels in the reel-spin game. In one embodiment, the selection may respin the particular reel while locking the other reels in the reel-spin game during the respin. For instance, the symbol 418 at the intersection of the third row 408*c* and the second column 416*b* is the only symbol in the third row 408*c* that does not correspond to a winning combination for the horizontal pay line 420. Accordingly, the player 112 may select to spin the position with the symbol represented by the character "3" or spin the entire reel including the symbol represented by the character "3."

In FIG. 5E, the respin operation is performed and, while the symbols associated with the first column 416*a*, the third column 416*c*, the fourth column 416*d*, and the fifth column 416*e* remain locked, the symbols associated with the second column 416*b* may change from the initial, or previous, spin. In the example shown in FIG. 5E, the symbol 418 at the intersection of the third row 408*c* and the second column 416*b* has changed and is now shown to correspond to a winning combination for the horizontal pay line 420 (e.g., including a same hatched background as the symbols 418 represented by characters "C," "H," "8," and "M"). In this case, the player 112 has won on the respin with the activated game enhancement feature (e.g., selected reel-spin and locked remaining reels).

As illustrated in FIG. 5F, in the event that the respin including the activated game enhancement features fails to provide a winning result for the player 112, a subsequent pop-up window 520 may be rendered by the display device 238 of the gaming device 108. The subsequent pop-up window 520 may include an option, or offer, for the player 112 to try again, or activate the same or different game enhancement feature, in a subsequent respin. Similar to the pop-up window 504, the subsequent pop-up window 520 may include a description that additional credits may be required to retry, or perform a subsequent respin with activated game enhancement features. The subsequent pop-up window 520 may also include a "yes" icon 508 and a "no" icon 512 that may be selected by the player 112 to respond to the offer. Again, these icons 508, 512 may be associated with physical buttons on a gaming device 108 and/or a rendered image on the display screen 248 of the gaming device 108.

FIG. 5G illustrates a result of the respin of reel-spin game with the player-selected game enhancement feature activated and where a particular (e.g., player-selected) reel associated with the second column 416*b* of the plurality of reels remains locked while all other reels in the plurality of reels are unlocked during the respin. As shown in FIG. 5G, the symbols associated with the first column 416*a*, the third column 416*c*, the fourth column 416*d*, and the fifth column 416*e* have changed as a result of the respin (from symbols 418 represented by characters "C," "H," "8," and "M" to symbols 418 represented by characters "C'," "H'," "8'," and "M'") while the symbols associated with the second column 416*b* remain locked, or unchanged during the respin.

FIG. 5H illustrates a result of the respin of reel-spin game with the player-selected game enhancement feature activated where a particular (e.g., player-selected) position of the plurality of positions (e.g., in the array of symbol areas 404) is locked and all other positions in the plurality of reels are unlocked during the respin. In this example, all of the symbols 418 other than the player-selected position at the intersection of the third row 408*c* and the second column 416*b* have changed as a result of the respin. as illustrated by the prime designation associated with each other representative symbol 418.

Figure 6:
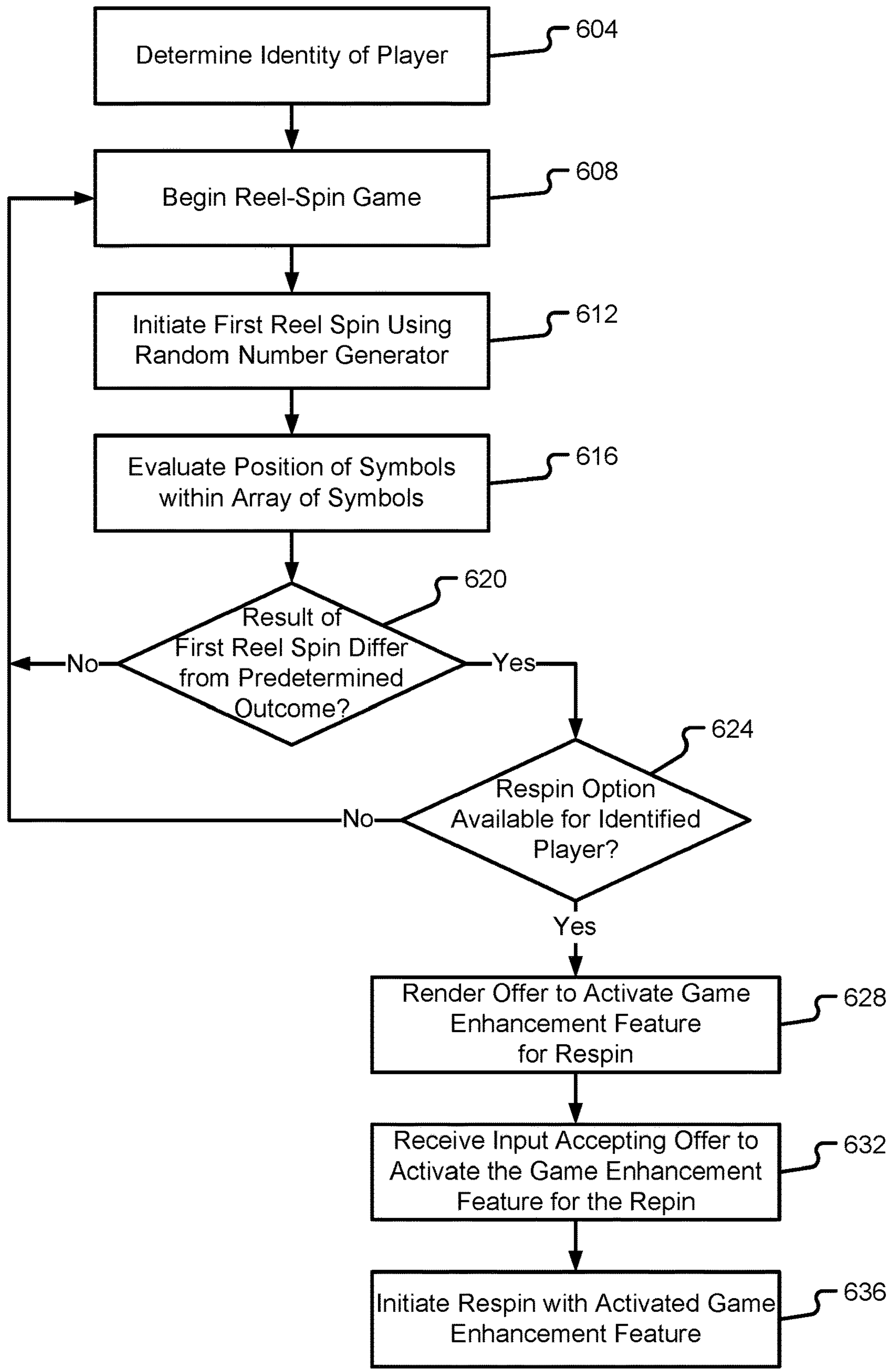
FIG. 6 is a flow diagram of an example process for offering a player an opportunity to activate a game enhancement feature as part of a respin of the reel-spin game.

With reference now to FIG. 6, a flow diagram depicting a method of offering a player 112 an opportunity to activate a game enhancement feature as part of a respin of the reel-spin game is shown in accordance with embodiments of the present disclosure. The methods described herein may be run as a set of instructions on a gaming device 108, a subscription service server 116, and/or some other server of the enhanced feature gaming system 100. In some embodiments, the set of instructions may be part of an application installed on one or more of the gaming devices 108, subscription service server 116, and/or other server that manages the behavior and/or operation of the gaming devices 108 in the enhanced feature gaming system 100. In any event, the method begins by determining an identity of the player 112 interacting with the gaming device 108 (step 604). In some embodiments, the cameras 278 of the gaming device 108 may record an image of the player 112 in proximity to the gaming device 108. The recorded image, and/or features in the recorded image, may be compared to player identification information stored in a memory location of a player information data structure 300 for the player 112 or a set of players 112. For instance, the gaming device 108 and/or the subscription service server 116 may compare the recorded information to player identification information stored in the player information field 304 that can be used to uniquely identify the player 112. This player identification information may comprise biometric measurements, retinal scan information, fingerprint information, heat signature information, and/or other unique identification information that differentiates one player 112 from another in the enhanced feature gaming system 100, the player information data structure 300, the player profile database 148, and/or the subscription database 152. In some embodiments, the gaming device 108 may read, via a game card reader (e.g., the cameras 278, the ticket acceptance device 270, etc.) of the gaming device 108, a game card of the player 112 including identification information about the player 112, or player identification information. The game card may be in the form of a ticket or player card with a magnetic strip, QR code, barcode, digital identification information, or other visual indicia embedded thereon. In some embodiments, the game card may comprise player identification information and/or a subscriber identification for a player 112 that matches with information stored in at least one memory location, or data structure, of the player profile database 148 and/or the subscription database 152. The player identification information may correspond to a unique string of data used to uniquely identify the player 112. For example, the player identification information may comprise an alphanumeric string, a character string, a binary string, and/or some other combination of data that uniquely identifies a player 112.

Next, the method proceeds when the player 112 begins a reel-spin game (step 608). Beginning a reel-spin game may comprise adding credits to unlock a game of the gaming device 108 and/or entering player 112 information to begin the reel-spin game. In one embodiment, the game instruction set 220 may initiate a first reel spin that leverages a random number generator to determine a final position of symbols in the array of symbol areas 404 of the reel-spin game (step 612). After the first reel spin is completed, the game instruction set 220 may evaluate symbols 418 laid out in the array of symbols 404 (step 616). The evaluation of symbols 418 may include determining which pay lines 420 will be subject to evaluation and whether any of the selected pay lines 420 have a predetermined combination of symbols 418 provided thereon. Eventually, the game instruction set 220 will evaluate the symbols 418 that land on a selected pay line 420 or a plurality of selected pay lines 420 to determine if the first spin resulted in a predetermined game outcome (step 620). The predetermined game outcome may include winning a prize, winning playing credit, winning money, winning a bonus spin, achieving a game achievement, etc., and/or otherwise falling below or meeting a predetermined payout amount for the first spin.

In the event that the result of the first reel spin differs from the predetermined game outcome (e.g., providing no payout, or a payout amount that is less than a predetermined payout amount), the method may proceed by determining whether a respin option is available for the identified player 112 (step 624). In some embodiments, the game instruction set 220 may cause the processor 204 to send a request for subscription services enrollment information about the player 112 to the subscription service server 116. The subscription service server 116 may access the subscription database 152 and, more specifically, retrieve information from a subscription service level field 344 stored in a subscription information data structure 332 for the player 112. The information may identify that, based on a subscription service level for the player 112, a respin option is available for the player 112. The respin option may include one or more game continuation rules corresponding to information in the subscription service level field 344 and the available offers field 352 of the subscription information data structure 332. These rules may define available game enhancement features for the player 112 that, among other things, can be activated on a respin. The activation of a game enhancement feature modifies or increases a win probability associated with the respin of the reel-spin game. Stated another way, the percentage chance of achieving a winning result on the respin with the game enhancement feature activated is greater than the percentage chance of achieving a winning result on the respin without the game enhancement feature activated. In some embodiments, the activation of multiple game enhancement features (e.g., combining a position-lock together with a modified symbol option, etc.) may be enabled further increasing the win probability on respin.

The method may continue by rendering an offer to activate the game enhancement feature for the respin (step 628). Stated another way, the offer may allow a player 112 to respin and/or lock at least a portion of the reels of the reel-spin game in a respin corresponding to the next game, or spin, of the reel-spin game. The game enhancement features may be defined by the offer rendered by the gaming device 108. As described in conjunction with FIGS. 5B and 5C, once a player 112 accepts the offer, a feature selection window 516 may be rendered by the display device 238 of the gaming device 108 to allow the player 112 to select one or more game enhancement features to activate for the respin. A player 112 may provide an input accepting the rendered offer via the display device 238, via a touchscreen, a user interface of a mobile device 142, physical buttons of the gaming device 108, etc. (step 632). Upon receiving the input from the player 112, the game instruction set 220 may prepare the reel-spin game for a respin including the activated game enhancement feature as defined by the game enhancement instruction set 232. The game enhancement instruction set 232 may lock one or more portions of the reels (e.g., symbols in the array of symbol areas 404) of the reel-spin game and the game instruction set 220 may initiate the respin that leverages a random number generator to determine a final position of the unlocked symbols in the array of symbol areas 404 of the reel-spin game (step 636).

Figure 7:
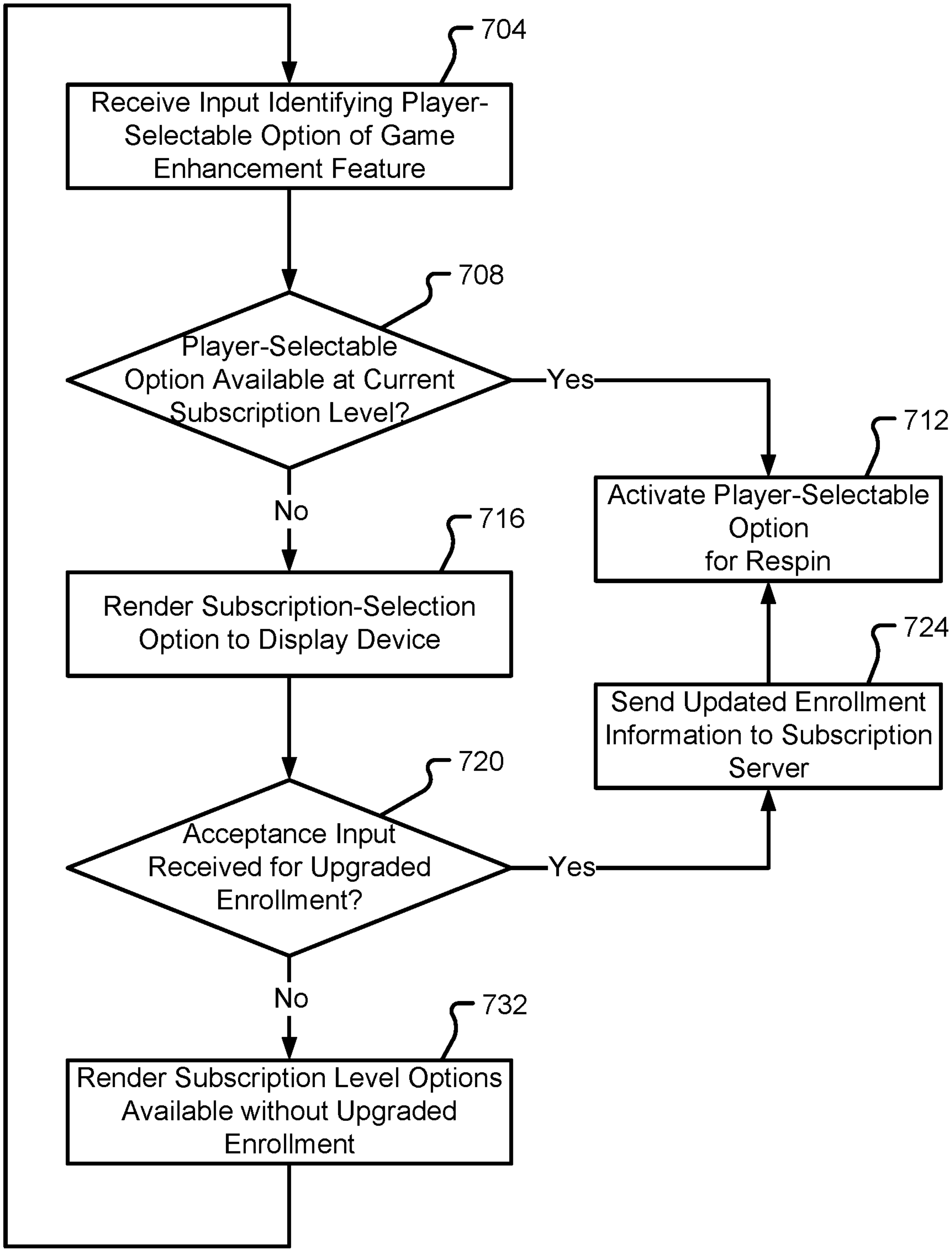
FIG. 7 is a flow diagram of an example process for determining available respin options and game enhancement features for a player enrolled at a subscription service level.

FIG. 7 is a flow diagram of an example process for determining available respin options and game enhancement features for a player 112 enrolled at a particular subscription service level with a subscription service server 116. The methods described herein may be run as a set of instructions on a gaming device 108, a subscription service server 116, and/or some other server of the enhanced feature gaming system 100. In some embodiments, the set of instructions may be part of an application installed on one or more of the gaming devices 108, subscription service server 116, and/or other server that manages the behavior and/or operation of the gaming devices 108 in the enhanced feature gaming system 100. The method may begin by receiving a selection input identifying a player-selectable option associated with a game enhancement feature (step 704). In some embodiments, this step may correspond to step 632 of the flow diagram described in conjunction with FIG. 6. The selection input may be provided by a player 112 interacting with the gaming device 108 via one or more physical buttons, touchscreens, display devices 238, and/or mobile devices 142. In one embodiment, the input may correspond to the selection of a game enhancement feature selection window rendered by the gaming device 108.

Next, the method continues by determining whether the selected option (e.g., the identified player-selectable option) is available for the player 112 (step 708). In one embodiment, the subscription service server 116 may retrieve information stored in the subscription service level field 344 and/or the available offers field 352 for the player 112 to determine if the selected option is available under the subscription service level the player 112 is currently enrolled in. If so, the method may proceed by activating the selected option, and the associated game enhancement feature, for the respin.

However, if the selected option is not available for the player 112 at the current subscription level, the method may proceed by the subscription service server 116 causing the gaming device 108 to render a subscription-selection option to the display device 238 (step 716). The subscription-selection option may allow a player 112 to upgrade a subscription service level for the player 112 to a level that includes the selected option for the respin. The subscription-selection option may include options to increase one or more subscription levels from the current subscription level for the player 112, each associated with a respective, and increasing, cost. In some embodiments, selecting the subscription-selection automatically charges the player 112 and causes the subscription service server 116 to update information stored in the subscription service level field 344 for the player 112.

The method continues by determining whether an input accepting the upgraded enrollment has been received from the player 112 (step 720). This input may be received at the gaming device 108 and sent to the subscription service server 116. Along with the input, the updated enrollment information may be sent from the gaming device 108 to the subscription service server 116 (step 724). The subscription service server 116 may then update the subscription information data structure 332 for the player 112. In particular, the subscription service server 116 may record enrollment update information in the time of enrollment field 340, the subscription service level field 344, the payment information field 348 of the subscription information data structure 332 in the subscription database 152.

If no input is received from the player accepting the upgraded enrollment, or an input is received denying upgraded enrollment, the method may continue by rendering subscription level options that are available without the upgraded enrollment (step 732). In some embodiments, this step may include rendering only available options and game enhancement features to the display device 238 of the gaming device 108 for activation in a respin. The method may continue by receiving input of one of the available options rendered.

A number of variations and modifications of the disclosure can be used. It would be possible to provide for some features of the disclosure without providing others. In some embodiments, each player-selectable option of the plurality of player-selectable options (e.g., comprising the game enhancement features, etc.) rendered by the display device comprises a respective cost associated therewith that is rendered by the display device, and the respective cost associated with each player-selectable option is based on the result of the reel-spin game and a calculated probability of a new result of the reel-spin game corresponding to the predetermined payout amount. Aspects include wherein, in response to receiving the input from the player accepting the offer to respin, the instructions further cause the processor to: decrement a credit meter of the gaming device corresponding to the respective cost associated with the player-selectable option selected by the player. Aspects include rendering, by the display device, a plurality of player-selectable options, as part of the offer, comprising a first option that, when selected by the player via the user interface, causes the processor to lock a particular reel of the plurality of reels and spin all other reels of the plurality of reels, and a second option that, when selected by the player via the user interface, causes the processor to respin the particular reel of the plurality of reels and lock all the other reels of the plurality of reels, and wherein the plurality of player-selectable options rendered by the display device comprises a third option that, when selected by the player via the user interface, causes the processor to respin a single identified position of the particular reel of the plurality of reels and lock all other positions of all the other reels of the plurality of reels, wherein each player-selectable option of the plurality of player-selectable options rendered by the display device comprises a respective cost associated therewith that is rendered by the display device, wherein the respective cost associated with each player-selectable option is based on the result of the reel-spin game and a calculated probability of a new result of the reel-spin game corresponding to the predetermined payout amount.

The present disclosure contemplates a variety of different gaming systems each having one or more of a plurality of different features, attributes, or characteristics. A "gaming system" as used herein refers to various configurations of:

(a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The invention claimed is:

1. A method, comprising:

determining, by a processor, a result of a play of a game played by a player interacting with a gaming device, wherein the result comprises a specific game outcome for the play of the game played;

retrieving, by the processor, game continuation rules from a game continuation register stored in a memory device, the game continuation rules comprising game outcomes that enable a game enhancement feature for a subsequent play of the game played by the player interacting with the gaming device, wherein the game outcomes are associated with outcome award amounts that are lower than a predetermined winning award amount;

determining, by the processor based on the game continuation rules and the result of the play of the game played, that the game enhancement feature is available for the player when an outcome award amount associated with the specific game outcome of the play of the game played is lower than the predetermined winning award amount and that the game enhancement feature is unavailable for the player when the outcome award amount associated with the specific game outcome of the play of the game played is greater than the predetermined winning award amount;

rendering, by a display device of the gaming device in response to determining that the game enhancement feature is available, an offer to activate the game enhancement feature for the subsequent play of the game, wherein the game enhancement feature modifies a win probability associated with the subsequent play of the game;

receiving, via a user interface of the gaming device, input from the player interacting with the gaming device accepting the offer to activate the game enhancement feature for the subsequent play of the game;

activating, based on the input accepting the offer, the game enhancement feature for the subsequent play of the game; and initiating, by the processor, the subsequent play of the game on the gaming device comprising the game enhancement feature activated.

2. The method of claim 1, wherein prior to retrieving the game continuation rules, the method comprises:

determining, by the processor, an identity of the player interacting with the gaming device; and determining, by the processor and based on the identity of the player, that the player is enrolled in the game continuation register.

3. The method of claim 2, wherein the game continuation rules are retrieved from the game continuation register in response to determining that the player is enrolled in the game continuation register.

4. The method of claim 3, wherein determining that the player is enrolled in the game continuation register comprises:

sending, via a communications interface of the gaming device coupled to the processor, a request for information about the player stored in a memory location of a subscription server separate from the gaming device; and determining, by the processor and in response to receiving the information about the player, the game continuation rules for the player and for the subsequent play of the game.

5. The method of claim 4, wherein determining the identity of the player interacting with the gaming device further comprises:

detecting, by a game card reader of the gaming device coupled to the processor, a game card presented by the player; and reading, by the game card reader, player identification information stored on the game card and associated with the player.

6. The method of claim 4, wherein retrieving the game continuation rules for the player further comprises:

extracting, by the processor, from the information about the player, enrollment information associated with the player comprising a subscription service level of the player.

7. The method of claim 1, wherein the game played is a reel-spin game comprising reels and a pay line that intersects the reels, and wherein the specific game outcome comprises a symbol aligned with the pay line for each reel of a number of the reels that are fewer than a total number of the reels.

8. The method of claim 7, wherein activating the game enhancement feature comprises:

locking, by the processor, the symbol aligned with the pay line for each reel of the number of the reels during the subsequent play of the game; and unlocking, by the processor, at least one symbol in the total number of reels allowing the at least one symbol in the total number of reels to change during the subsequent play of the game.

9. The method of claim 8, further comprising:

adding, by the processor, a modified symbol option to at least one reel of the reels as a part of activating the game enhancement feature;

determining, by the processor after the subsequent play is initiated, a subsequent result of the subsequent play of the game, wherein the subsequent result comprises a subsequent specific game outcome for the subsequent play of the game;

determining, by the processor, whether the subsequent specific game outcome corresponds to a maximum winning award amount for the subsequent play of the game;

determining, by the processor when the subsequent specific game outcome is determined not to correspond to the maximum winning award amount for the subsequent play of the game, a winning symbol for the modified symbol option; and rendering, by the display device of the gaming device in response to determining the winning symbol, the modified symbol option as the winning symbol altering the subsequent specific game output to correspond to the maximum winning award amount.

10. The method of claim 9, wherein the modified symbol option is at least one of wild symbol and a bonus symbol.

11. A method, comprising:

receiving, via a communications interface, a request for subscriber information about a player interacting with a gaming device that is separate from a server;

determining, via a processor, that the player is enrolled in a gaming subscription register stored in a memory location of the server; and sending, via the communications interface, the subscriber information about the player comprising game continuation rules for the player, the game continuation rules defining game outcomes for games played by the player on the gaming device that enable a game enhancement feature for a subsequent play of the game played by the player interacting with the gaming device, wherein the game outcomes are associated with outcome award amounts that are lower than a predetermined winning award amount, wherein the game enhancement feature is available for the player in the subsequent play of the game when an outcome award amount associated with a specific game outcome of a play of the game played by the player interacting with the gaming device is lower than the predetermined winning award amount, and wherein the game enhancement feature is unavailable for the player in the subsequent play of the game when the outcome award amount associated with the specific game outcome of the play of the game played by the player interacting with the gaming device is greater than the predetermined winning award amount.

12. The method of claim 11, wherein prior to sending the game continuation rules, the method comprises:

determining, by the processor, an identity of the player interacting with the gaming device; and determining, by the processor and based on the identity of the player, that the player is enrolled in the game continuation register.

13. The method of claim 12, wherein the game continuation rules are retrieved from a game continuation register in response to determining that the player is enrolled in the game continuation register.

14. The method of claim 12, wherein determining the identity of the player interacting with the gaming device further comprises:

detecting, by a game card reader of the gaming device coupled to the processor, a game card presented by the player; and reading, by the game card reader, player identification information stored on the game card and associated with the player.

15. The method of claim 11, wherein sending the game continuation rules for the player further comprises:

extracting, by the processor, from the information about the player, enrollment information associated with the player comprising a subscription service level of the player.

16. The method of claim 11, wherein the game played is a reel-spin game comprising reels and a pay line that intersects the reels, and wherein the specific game outcome comprises a symbol aligned with the pay line for each reel of a number of the reels that are fewer than a total number of the reels.

17. The method of claim 16, wherein activating the game enhancement feature comprises:

locking, by the processor, the symbol aligned with the pay line for each reel of the number of the reels during the subsequent play of the game; and unlocking, by the processor, at least one symbol in the total number of reels allowing the at least one symbol in the total number of reels to change during the subsequent play of the game.

18. The method of claim 17, further comprising:

adding, by the processor, a modified symbol option to at least one reel of the reels as a part of activating the game enhancement feature;

determining, by the processor after the subsequent play is initiated, a subsequent result of the subsequent play of the game, wherein the subsequent result comprises a subsequent specific game outcome for the subsequent play of the game;

determining, by the processor, whether the subsequent specific game outcome corresponds to a maximum winning award amount for the subsequent play of the game;

determining, by the processor when the subsequent specific game outcome is determined not to correspond to the maximum winning award amount for the subsequent play of the game, a winning symbol for the modified symbol option; and rendering, by the display device of the gaming device in response to determining the winning symbol, the modified symbol option as the winning symbol altering the subsequent specific game output to correspond to the maximum winning award amount.

19. The method of claim 18, wherein the modified symbol option is at least one of wild symbol and a bonus symbol.

* * * * *